United States Patent [19]
Criswell et al.

[11] Patent Number: 5,223,781
[45] Date of Patent: Jun. 29, 1993

[54] POWER COLLECTION AND TRANSMISSION SYSTEM AND METHOD

[76] Inventors: David R. Criswell, 4003 Camino Lindo, San Diego, Calif. 92122; Robert D. Waldron, 15339 Regalado St., Hacienda Height, Calif. 91745

[21] Appl. No.: 490,717

[22] Filed: Mar. 8, 1990

Related U.S. Application Data

[63] Continuation of Ser. No. 157,081, Feb. 11, 1988, Pat. No. 5,019,768, which is a continuation of Ser. No. 732,352, May 8, 1985, abandoned, which is a continuation-in-part of Ser. No. 513,444, Jul. 13, 1983, abandoned.

[51] Int. Cl.[5] .......................... B64G 1/00; H02M 7/00
[52] U.S. Cl. .................................... 322/2 R; 290/1 R; 244/159
[58] Field of Search ...................... 322/2 R; 290/1 R; 244/159

[56] References Cited

U.S. PATENT DOCUMENTS

| | | | |
|---|---|---|---|
| 3,225,208 | 12/1965 | Wolfe | 322/2 R X |
| 3,999,182 | 12/1976 | Moeller et al. | 343/100 SA |
| 4,078,747 | 3/1978 | Minovitch | 322/3 R X |
| 4,251,679 | 2/1981 | Zwan | 322/2 R X |
| 4,305,555 | 12/1981 | Davis | 322/3 R X |
| 4,371,135 | 2/1983 | Keigler | 322/2 R X |
| 4,490,668 | 12/1984 | Sterzer | 322/2 R |
| 5,019,768 | 5/1991 | Criswell et al. | 322/2 R |

Primary Examiner—R. J. Hickey
Attorney, Agent, or Firm—Brown, Martin, Haller & McClain

[57] ABSTRACT

A system for transmitting microwaves to one or more receiver assemblies comprises an array of separate microwave transmitting assemblies for emitting a plurality of microwave beams, the array being arranged to apparently fill a radiating aperture of predetermined shape and size when viewed from the direction of a receiver assembly, and a phase controlling assembly associated with the microwave transmitting assemblies for controlling the relative phase of the emitted beams to form at least one composite shaped microwave beam directed to at least one receiver assembly. The receiver assembly is located in the near field of the microwave beam. The transmitting assemblies are each associated with separate power sources comprising solar power collecting assemblies. In one arrangement the transmitting system is on the moon and the or each receiver assembly is on Earth.

9 Claims, 10 Drawing Sheets

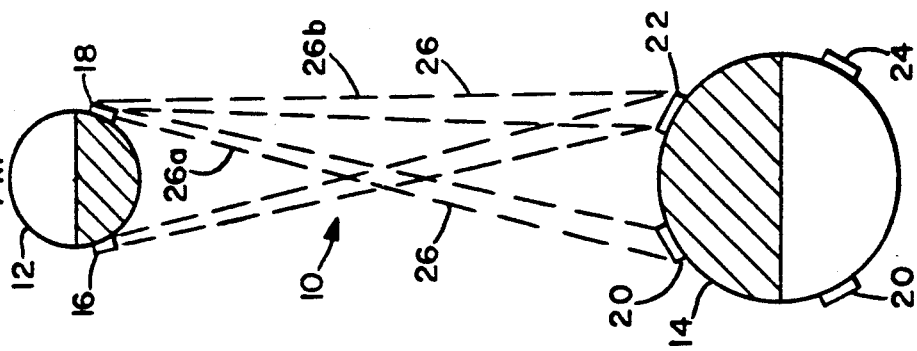
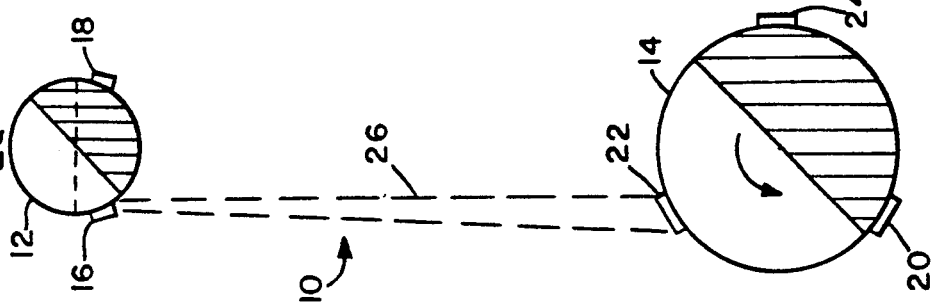
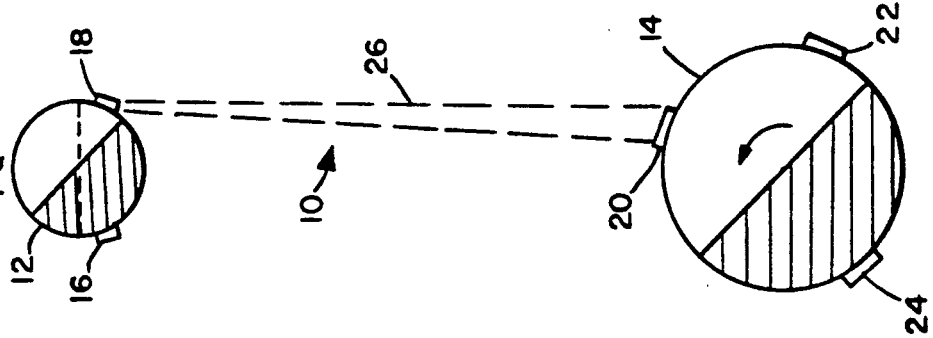
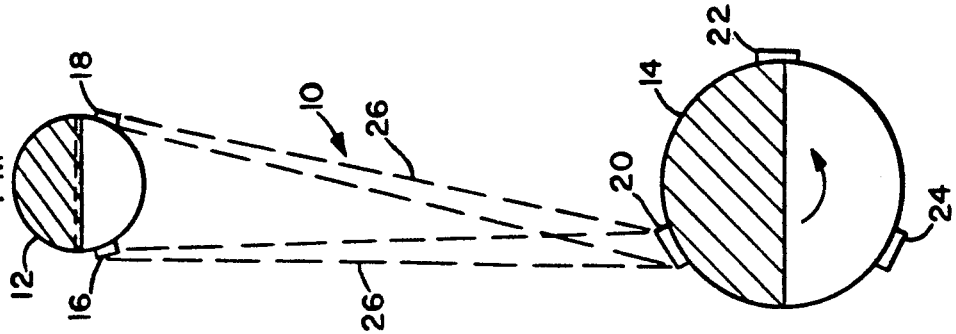

POWER COLLECTION AND TRANSMISSION SYSTEM AND METHOD

This application is a continuation of application Ser. No. 07/157,081, filed Feb. 11, 1988, now U.S. Pat. No. 5,019,768, which was a continuation of application Ser. No. 06/732,352, filed May 8, 1985, now abandoned, which was a continuation-in-part of application Ser. No. 06/513,444 of the same applicants, filed Jul. 13, 1983, now abandoned, and entitled "Lunar Power System."

BACKGROUND OF THE INVENTION

The present invention relates generally to the collection and transmission of power, and is particularly concerned with the collection of solar power and its transmission in the form of a microwave beam.

Electric power supplies for most of the earth's inhabitants are currently provided by heat engines (steam turbines or the like) fueled by combustion of fossil fuels (coal, oil and/or natural gas). Progressive exhaustion of readily accessible fossil fuel sources, particularly oil and gas, has led to higher prices, shortages, and prospects for even more expensive and inaccessible fossil fuel supplies in the future.

Renewable energy sources including direct and indirect solar energy systems, the latter including hydroelectric, wind, ocean thermal, photosynthetic fuels (biomass), production of hydrogen and others currently furnish an important but minor fraction of the earth's electric energy. These resources should eventually furnish virtually the entire energy supply unless nuclear fusion energy is rendered economically and technically feasible in the future.

Most of the direct and indirect solar power systems are subject to geographic and climatological limitations. The solar power systems are also subject to variable and unpredictable changes or interruptions of output power. This has necessitated the use of reserve power systems (usually fossil fuel fired) or the use of restrictions on usage to only portions of the daily or long-term power usage cycles. These techniques unfavorably affect the economics of renewable energy use.

Despite these problems, ongoing development work is proceeding for making direct use of solar photovoltaic conversion systems, particularly for locations in latitudes with sunny climates. Current and near-term projected costs of conversion elements are far too high to be competitive with fossil fuel systems, even in the absence of power storage systems associated therewith. Coupled with this is the fact that the most advantageous applications of photoconversion are in economically underdeveloped and isolated regions on earth. There is hope that improvements in engineering and manufacturing methods may lead to systems which are cost competitive with future fossil fuel power systems.

There have been proposals in the past to collect solar power by means of earth orbiting satellites carrying solar collectors, and then to beam the power to suitable rectenna or receiver structures on earth, where the power is stored and distributed to users. Because of the many technological problems involved, none of these systems have yet been put into effect.

One proposal for such a system is described in U.S. Pat. No. 3,781,647 of Glaser, in which an orbiting satellite collects sunlight, converts it into electrical energy, converts the electrical energy to microwaves and beams the microwave power to earth from a planar phased array of microwave transmitters. One problem with this system is that it operates in the so-called "far field" or divergent area of the microwave beam, as is also the case in virtually all radar and high gain communications systems. The radiating near and far field regions of a wave field propagating from a radiating aperture (e.g. antenna) structure are separated by a near field transition length which is approximately equal to $L = D^2/w$ where D is the aperture diameter and w is the wavelength. In the radiating near field in Fresnel region ($L_n < L$), the maximum optical path difference from a field point to the distributed points of the aperture plane exceeds several wavelengths regardless of whether the field point is on or off axis of the system. Under such conditions, the radiated intensity is effectively averaged or smoothed for lateral displacement within the geometric optic beam and rapidly attenuates beyond the beam edge. Thus a beam is produced which closely approximates the geometric optics limit. In contrast, the radiating far field (Fraunhofer) region is divergent and has a maximum optical path difference of less than a wavelength between an axial field point and all points of the aperture plane. The radiated intensity decreases with lateral excursion from the beam center (with or without undulations depending on details of the aperture excitation.

Where an antenna system is used to transmit microwave power from a satellite, as taught by Glaser, the size of the antenna is limited, R is fixed, and the transition length L will be of the order of 10,000 km (for $D = 1$ km and $w = 10$ cm). Since geosynchronous satellites orbit at 36,000 km, the operating distance is more than three times the near field transition length for the above case. Thus the coherent microwave power of the beam will extend in a lobe-like Fraunhofer diffraction pattern across the earth. Because of the constrains on antenna sizes and operating frequencies for which sufficient atmosphere transparency exists, it would not be practical to operate in the near field in the Glaser system. The minimum beam diameter at the earth receiver would be about 3.6 km, and the approximate beam diameter would be 10 km. Thus the receiver must be very large in order to receive a substantial portion of the power adding considerable expense to the system.

While the Glaser system has certain merit in terms of providing the earth with needed electrical energy, there are major problems associated with the development of such a system. Primarily these considerations are both technological and economic. Technologically, there are many unanswered questions with regard to the feasibility and long term reliability of such terrestrial and space borne power generating systems. There are environmental problems restricting the total power which may be transmitted in this way. Such systems are also extremely expensive.

SUMMARY OF THE INVENTION

It is an object of the present invention to provide an improved system for transmission of microwaves.

It is a further object of the present invention to provide microwave transmission system which operates in the radiating near field where the beam is substantially uniform and at least partially or slightly convergent and can be aimed more precisely at a relatively small receiving or rectenna structure.

According to one aspect of the present invention a microwave transmission system is provided which comprises an array of separate microwave radiators which are arranged to fill a radiating aperture of predetermined size when viewed from a microwave receiver assembly, each radiator emitting a separate microwave beam, a controller assembly for controlling the relative phases of the radiated beams to form a single, shaped composite microwave beam aimed at the receiver assembly, the receiver assembly being positioned in the radiating near field of the composite microwave beam, i.e. at a distance R which is less than about $D^2/w$ where D is the diameter of the effective radiating aperture and w is the wavelength of the microwaves.

Preferably, the microwave transmission system is associated with a solar collector assembly comprising a plurality of solar collectors each associated with a respective one of the microwave radiators. Each collector preferably comprises an array of photoconversion devices and each microwave radiator may comprise an antenna array electrically connected to the collector array via a suitable underground grid, for example. Thus there is no single power source supplying power to all the individual radiators in the array, but there are a plurality of subassemblies each comprising a solar collector, a converter for conditioning and converting solar power to microwaves either directly or indirectly, and an individual microwave radiator. Thus if any one of the subassemblies should fail there will be little reduction in the overall power transmitted.

The controller assembly may be preprogrammed to shape and direct the composite microwave beam by suitable phase control of the individual radiators or microwave transmitters, e.g. by a controlled phase shifting network connected to the various microwave transmitters, as is well known in the development of phased array radars.

Such a system may be based on earth or extraterrestrially, for example on the moon.

According to another aspect of the invention a lunar power system may be provided which comprises a solar power collection device, means for converting solar power into microwaves, and an array of separate microwave transmitters or radiators which when viewed from a receiver structure on earth will appear to fill an aperture of predetermined size such that the receiver structure is in the near field of the microwave beam. A suitable phase controlling system is provided to direct and shape the beam, and this can be controlled to take into account the variations in the relative positions of the radiating aperture on the moon and the receiver system on the earth during the monthly and annual cycles of the two planetary bodies. The phasing is suitably controlled via integrated circuits as is done in phased array radars. Thus the array of microwave radiators is beam shaped to illuminate a fixed Earth receiver or rectenna site as the lunar elevation changes. The beam is steered electronically via the phase control mechanism.

By positioning the microwave antenna structure on the moon, the effective aperture can be made very large, and much larger than any satellite-borne antenna. Thus the beam can be aimed more accurately, the rectenna can be located in the near field, and more power can be transmitted.

Thus it is an advantage of this aspect of the invention, that a lunar based power system can be provided that minimizes the need for Earth facilities to redistribute power and the quantity of power beams passing through the atmosphere of Earth, thus reducing environmental problems.

The system may also be used to supply reliable power to mobile airborne, or space orbital structures and systems on the moon to permit operation of a number of civil, industrial, scientific or military operations at locations desirable for mission requirements.

The lunar power system may also be used to provide local power in space and on the moon to permit expansion and further industrial development in the vicinity of the power plant so as to eventually provide construction materials and manufacturing capability for use in space or for return to Earth.

The lunar power system may use native, beneficiated and refined lunar materials, with a minimal deployment of earth-supplied materials, equipment, and manpower. Large amounts of electrical power may be recovered from relatively simple structures made primarily of lunar materials emplaced on and in the lunar surface, and such power could be used on the moon, beamed back to Earth directly or by use of orbiting structures to redirect the beams. As a result of the above, large amounts of power could be returned to Earth without requiring the lifting of large masses from either the earth or the moon and without the necessity of constructing large, highly integrated, multipurpose space vehicles or other complex orbiting structures.

The solar energy receiving or collection device is derived primarily from materials available on the lunar surface. This receiving device preferably comprises separate arrays of photoconverters positioned at locations generally corresponding to the earthward portions of the east and west limbs of the moon's diameter. However other locations ae possible. The solar power collection device in one embodiment is a plurality of ridges of photoconverters, each of the ridges having a glass-like surface covering compacted lunar soil. Each microwave transmitter is associated with a predetermined plot of ridges, and a plurality of segmented microwave transmitters and reflectors are coordinated across the array so as to be convergent on a given target associated with a receiver structure normally situated on Earth. The receiver structure has the capability of converting the microwave beam into electrical power suitable for use on electrical grids on earth.

In alternative embodiments, the present invention further comprises a lunar reflector maintained in orbit generally about the moon. This lunar reflector directs the solar radiant power to the solar power collection device on the lunar surface. The present invention may also further comprise a lunar orbital reflector or retransmitter device maintained in orbit about the lunar surface for directing the microwave beam from the radiating aperture on the moon to one or more receiver structures which may be on earth, in space, or on the moon at other locations. The present invention may further include one or more earth reflectors maintained in orbit about the earth for directing the microwave beam to the receiver structure. Each earth reflector will switch from one receiver structure to another during its orbit about the earth.

BRIEF DESCRIPTIONS OF THE DRAWINGS

The above and other objects and advantages of the present invention will become clear from the following detailed description of some preferred embodiments of the invention, taken in conjunction with the accompanying drawings, in which like reference numerals refer to like parts and in which:

FIGS. 1 A-E show the arrangement of lunar power stations on the moon and the sequential delivery of power to microwave receivers on Earth in a power transmission system according to one embodiment of the invention. The sequence illustrated by FIGS. 1 A-E illustrates the operation of the lunar power station as a function of the moon's rotation about the Earth. This view is in a reference frame fixed to the centers of the moon and Earth;

FIG. 3d is a side elevational view of a microwave reflector of FIG. 3a;

FIG. 6 shows a set of Chevron-like structures fused into the lunar soil;

FIG. 8 shows a photoelectron emission device impressed into the lunar soil;

Figure 15:
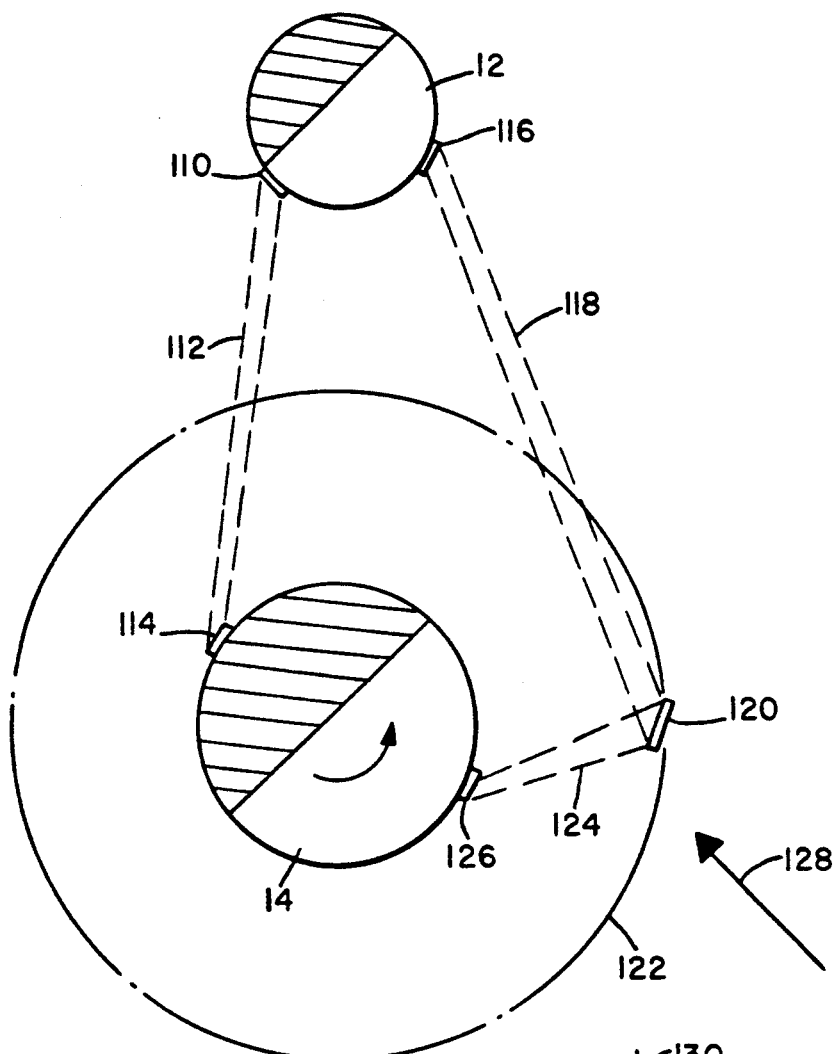
Figure 16:
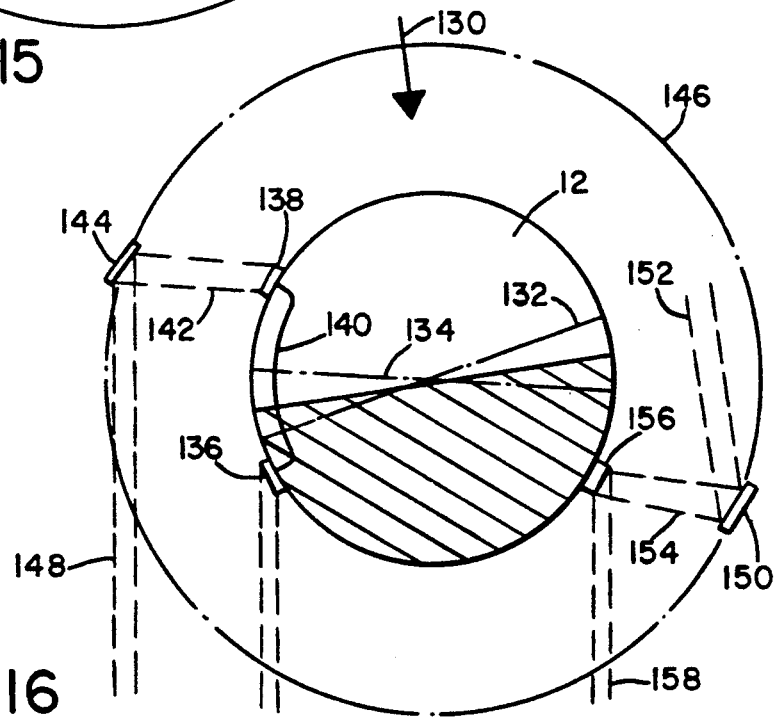

FIG. 15 is an alternative embodiment of the lunar power station of the present invention in which a microwave reflector is positioned in earth orbit to direct the energy beam from the moon to a desired location on earth; and FIG. 16 shows an alternative embodiment of the present invention in which reflector units are placed in orbit about the moon so as to redirect either radiant energy to the lunar surface or microwave beams from the lunar surface.

DESCRIPTION OF THE PREFERRED EMBODIMENTS

In all of the embodiments discussed below the provision of a power collection and transmission system on the moon for directing power to one or more receiver structures on the earth is described. However, it will be understood that the power transmission system may also be Earth-based, with suitable adjustments in the dimensions of the radiating aperture for transmitting power to an associated Earth-based receiver structure. In another alternative arrangement a lunar-based power transmission system may be associated with lunar, orbiting, or other non-Earth based receiver structures, either in addition to or in place of the Earth based receivers. The power transmission system need not be located on the moon but could be located on any suitable body in a sufficiently stable orbit about the Earth. Although the systems described below incorporate solar power collectors, other forms of power may be used for converting to microwave power, for example, fossil fuels.

The various embodiments of the invention illustrated in the drawings relate to the transmission of power in the form of a directed, convergent microwave beam 1 from one or more transmission systems 2 to the remote receiver devices 3, the receiver devices being located in the near field of the microwave beam.

In the preferred embodiment of the invention one or more lunar power stations are provided for collecting solar power, converting it into an energy form suitable for transmission to earth, and transmitting the energy in a uniform and at least partially convergent beam directed at one or more receiver structures on Earth. The energy is preferably transmitted as a short, high frequency radio wave or microwave, but shorter wave visible, ultraviolet or infrared optical beams generated by coherent laser sources may alternatively be used.

FIGS. 1A to 1AE illustrate the positioning of two lunar power stations 16, 18 on the moon 12 relative to receiver structures 20, 22 and 24 on Earth during various phases of the moon. Each power station will comprise solar collector assemblies, converters for converting solar power to microwaves, and microwave transmitters or radiating antennas to transmit one or more microwave beams 26 towards the receiver structures on Earth. The converters may include devices for power accumulation, release and conditioning.

As shown in FIGS. 1A to E, the solar power stations are located on the east and west limbs of the moon 12, respectively. The receiver structures comprise microwave receiving units 20, 22, and 24 positioned about the surface of the earth. The microwave receiving units are positioned so as to receive the transmitted microwave beams from the transmitters on the moon. The operation of the lunar power system in relation to the relative motions between the moon 12 and the Earth 14 will now be described.

The operation of the lunar power station is sequentially illustrated by FIGS. 1 A-E. In these figures, a view of the moon 12 and the Earth 14 is shown from north of the ecliptic plane. The shaded areas are the night side of the two bodies. The moon is phase-locked with the Earth so that the same general side of the moon always faces the direction of the Earth. The moon rocks about the line between the centers by about plus or minus 7° or arc.

FIGS. 1A and 1E show the lunar power station system 10 of the present invention when the moon 12 is full as viewed from Earth. When the moon is full, the solar collecting assemblies in both power stations 16 and 18 collect solar radiant power since the sun acts on both units. The incident solar radiant power is converted to electrical power in D.C. or low frequency AC form. This photon to electricity conversion can be accomplished with direct photovoltaics, thermo-photovoltaics, heat engines, or other devices now known for such conversion. Some or all of the electrical power is reconverted and transmitted in the form of a coherent photon beam, such as microwave beam, to a single target on earth. This single target is microwave receiving unit 22 (FIG. 1A) located at a position on the moonward hemisphere of the earth. The microwave receiving unit 22 then converts the received microwave beam into energy usable in another form, such as electrical energy. As can be seen in FIG. 1A, the signals from the transmitters in power stations 16 and 18 are converged and directed toward the target area on Earth, as will be described in more detail below. While FIG. 1A shows the beams 26 as slightly divergent from the moon 12 to Earth 14, it is preferable that beams 26 are convergent to a location on Earth 14. The receiving area on Earth would not necessarily have to be larger than the transmission aperture on the moon. As illustrated in FIG. 1A, the amount of energy received and transmitted can be twice that available from a single unit of a given size located on the moon.

FIG. 1B shows the moon 12 in its last quarter. At this point in time, the solar collecting assemblies in power station 18 are in darkness while the power station 16 is exposed to solar radiant power. Since station 18 is not exposed to sunlight, no power is transmitted from unit 18 to Earth. However, each power station may be provided with suitable energy storage means, as described in more detail below, to permit transmission during periods of darkness. The transmitted microwave signal 26 shown in FIG. 1B is directed toward microwave receiving unit 22 on the Earth's surface during a portion of the time unit 22 is on the moonward side of the Earth.

FIG. 1C shows the lunar power station system 10 at new moon. No power is generated in this arrangement since both power stations 16 and 18 are in darkness. Hence, no power is transmitted in microwave form from the moon 12 to earth 14. However, the power stations may include suitable energy storage devices to permit power to be stored during daylight periods for transmission during periods of darkness.

FIG. 1D shows the lunar power system 10 when the moon is in its first quarter. At this time, the power station 16 is in darkness and receiving unit 18 is exposed to sunlight. Receiving unit 18 transmits the solar energy in the form of a microwave signal 26 to microwave receiving unit 20 on Earth 14.

Finally, FIG. 1E shows full moon 12. As in FIG. 1A, both solar energy receiving units 16 and 18 focus and direct their microwave transmission 26 to receiving unit 20 on Earth. As shown in FIG. 1E, multiple beams 26a and 26b may be transmitted from a given unit such as 16 to two or more different receiving units, e.g. units 20 and 22. As can be seen in a comparison of FIGS. 1A and 1E, the transmitter on the moon is synchronized so as to deliver power to the receiving units generally on the moonward side of the Earth. This will depend on the relative rotation of the Earth with respect to the moon. The receiving units on the far side of the Earth relative to the moon at any time may also be associated with suitable energy storage devices so that continuous power is available at any time. Many suitable storage methods are known, for example, pumped hydrostorage or compressed air stored in underground caverns.

Figure 4:
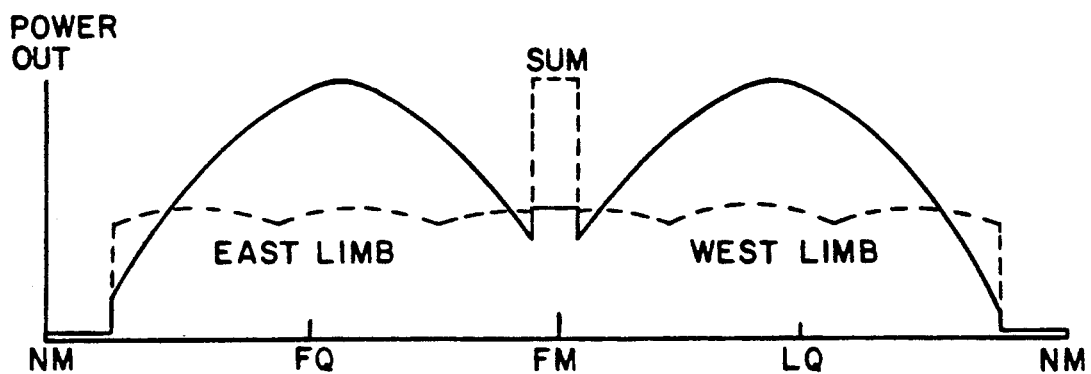
FIG. 4 is a graphical representation of the power generation capability of the lunar power stations as a function of the position of the moon in relation to the sun.
Figure 5:
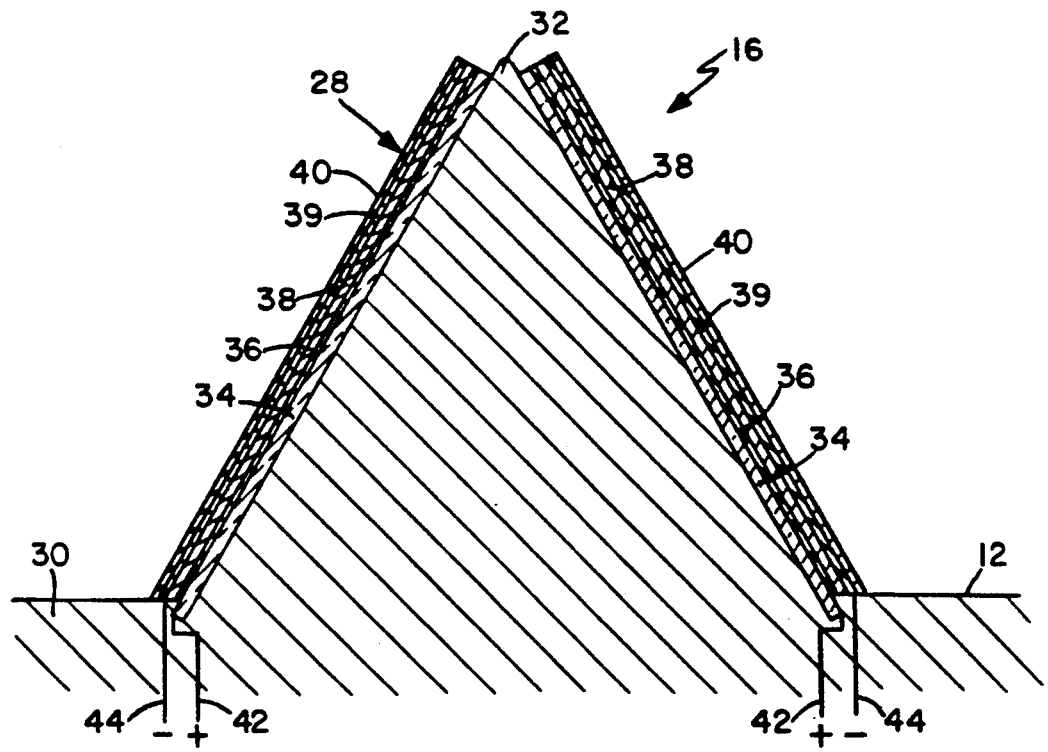
FIG. 5 is a cross-sectional view of the ridge form of the solar converter in accordance with one preferred embodiment of the present invention.

FIG. 4 is a graphical representation of the power output curves for the lunar power station system 10. In this graph, the total power generated by the lunar power station system is represented by the dotted line. The solid line represents the power that would be received by photoconverters of equal area placed flat on the lunar surface. This graph generally shows the power output as a function of the phase of the moon. As can be seen from FIG. 4, the maximum power is generated when the moon is full. This summing of transmitted power to high levels occurs in free space in the electromagnetic fields. The minimum power occurs near new moon. Between one or two days past new moon and just prior to full moon, the total power generated is relatively constant for a preferred collection geometry such as is shown in FIG. 5, for example (described in detail below). However, if continuous power generation is needed throughout the lunar cycle, one must either not transmit all the available power, storing the non-transmitted power for example by batteries, superconducting electrical coils and/or capacitors, flywheels, thermal or gravitational energy storage on the moon, or illuminate the solar collectors near new moon by using orbital sunlight reflectors or by relocating some of the collectors past the visible limb on the far side of the moon as viewed from Earth.

In the preferred embodiment of this invention, as illustrated in FIG. 1, the arrangement is to locate one transmitting array 18 on the east limb of the moon and another array 16 on the west limb of the moon. This will generally serve to provide a beam of power 26 toward Earth receivers 20, 22 and 24 during most of the lunar month.

Figure 2:
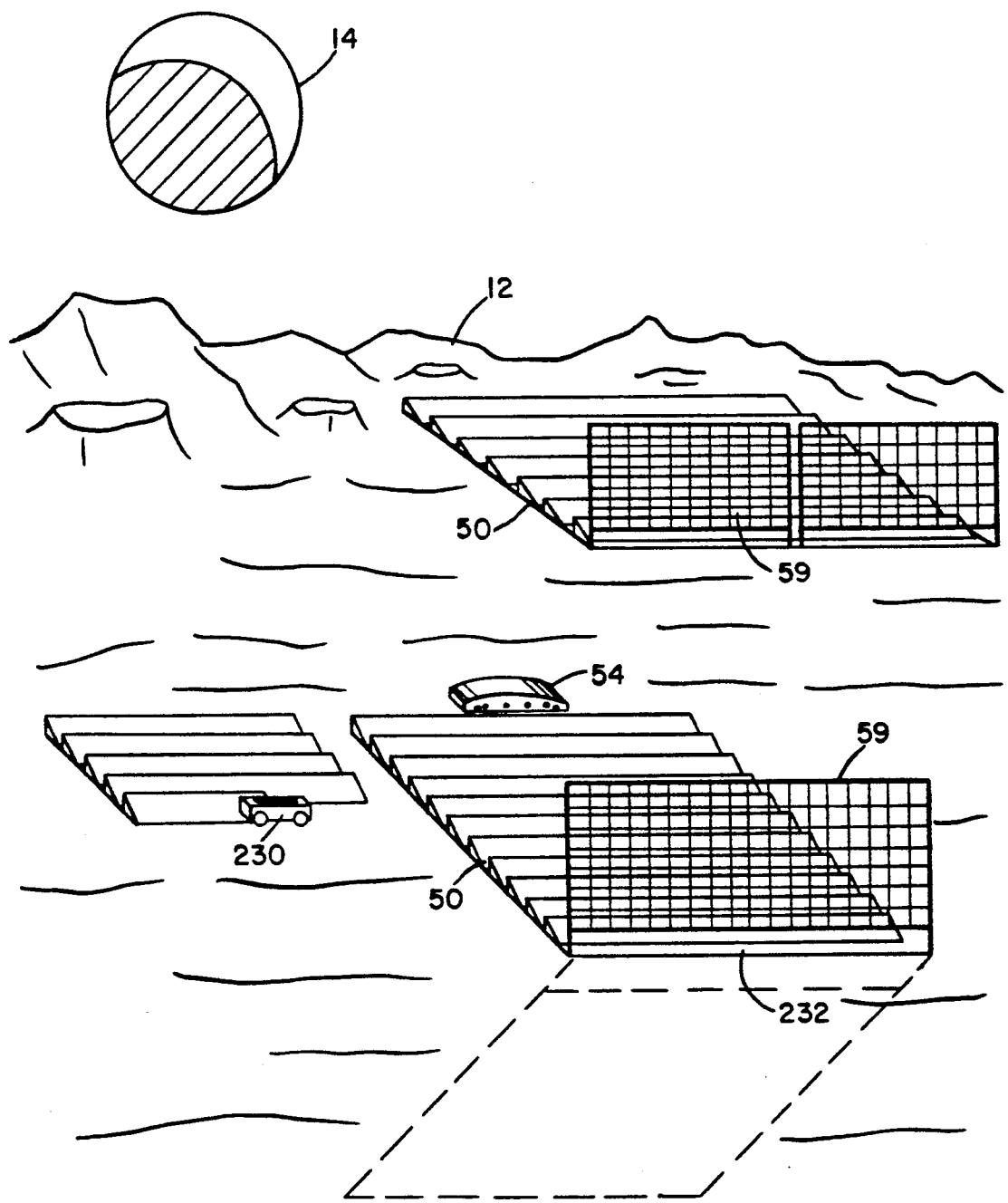
FIG. 2 is a schematic representation of a lunar power station according to one embodiment of the invention.

The specific form of each lunar power station 16, 18 in the preferred embodiment of the invention will now be described. FIG. 2 is a schematic representation of one of the power stations during construction, and FIGS. 3a to 3d are schematic representations of solar power collectors and microwave transmitters in the power station. Each power station will comprise a plurality of separate solar collecting areas 50, which need not be of equal size. Each collecting area is associated with a converter assembly for converting solar power into microwaves, and one or more microwave radiating or transmitting assemblies such as transmitters 54 and radiating antennas 59 for transmitting a microwave beam. Each transmitter 54 may comprise one or more individual microwave transmitters and may transmit a plurality of microwave beams. The transmitters may comprise microwave diodes, for example, which can be designed to transmit at least two simultaneous microwave beams. However, any suitable type of microwave transmitter may be used. In the preferred embodiment, the individual transmitters do not direct their transmitted beams in an earthward direction, but are associated with microwave reflectors or wavefront management devices 59 for directing the beams towards one or more receiver units on Earth. Each transmitter may be associated with one or more reflectors. The microwave transmitting system comprising the various microwave transmitters and associated reflectors is in form of an extended quasi-planar transmitting array. The relative phases of the transmitted microwave beams are controlled to form a composite microwave beam of predetermined shape and direction.

With the lunar power system shown, the receiver units can be located in the radiating near-field region of the transmitted composite microwave beam, and the various transmitted beams from the individual transmitters in the array can be controlled, for example by phase shifting integrated circuits as used in phased array radars, to shape and direct one or more composite microwave beams and to allow for the changes in the lunar elevation and the relative positions of the transmitter and receiver units as indicated in FIG. 1.

By positioning the transmitting system on the moon, there is little or no limitation on the overall size of the transmitting array. The radiating near and far field regions of a propagated wavefront are separated by the transition length, L, which is approximately given by:

$$L = D^2/w$$

in which D is the diameter of the radiating aperture and w is the wavelength. For microwaves, w is in the range from about $10^{-3}$ m. to about 1 m. For a wavelength of 10 cm. and a transmitting array diameter of 10 km, the transition distance to the far field is therefore $10^6$ km. Thus, the Earth would be well within the near field of the transmitted composite microwave beam, allowing relatively precise directing and at least partial convergence of the beam onto a relatively small receiver unit. Because of the large lunar area availability, it would be feasible to construct much larger antenna arrays on the moon, for example of 100 km or more diameter, making the distance to the far field equal to $10^8$ km. The Earth would then be even further within the near field, with consequent increased efficiency in power reception.

An oversized antenna aperture shared by many beams affords many methods for controlling multiple beams and the characteristics of any given beam such as diffraction limit, side lobe levels, position of beam center line, depth of field, and location of the focal region. The oversized array on the moon can use all the modern techniques of phased array electronics and geometric optics to control many separately directed beams simultaneously projected by each segmented array on the moon to form a shaped, convergent, composite beam. Thus, both small and large receivers on Earth or in space can be equally efficient in the reception of power. A 100 km diameter lunar antenna operating with 10 cm microwave would have a minimum central spot size at Earth of approximately 400 m. Most rectennas would be 2 or more times larger. A few hundreds of Megawatts of power could be received by a rectenna only a kilometer across.

FIG. 3 is a schematical representation of one embodiment of the lunar power station 16 or 18 incorporating an array of microwave transmitters located on the lunar surface. Generally, solar collector and converter devices or other energy sources are grouped into individual areas indicated by plots 50. Electrically conducting wires 52 collect electrical power from the solar collectors and converters and conduct the electrical power to a central transmitter 54 associated with each plot 50, which suitably comprises a plurality of microwave antennas. No particular wiring geometry is implied by wires 52, as illustrated in FIG. 3. The general area 56 surrounding the array of microwave radiating assemblies, as shown in FIG. 3A, comprises a radiating or transmitting aperture. Either solid state or conventional means of generating coherent microwaves can be employed at transmitters 54. Each transmitter 54 will normally comprise one or more individual microwave generators, such as microwave diodes, for example. Each plot 50 can be independent and separate from its neighbors for electrical collection. Electricity collection units and transmitters 54 in a given location may be interconnected by sub-surface wires 57 and switches. In this way, reliable transmission of power can be achieved even in the advent of a need to replace or repair solar collectors in a given plot 50.

Each microwave transmitter 54 may be capable of producing more than one microwave signal. Transmitter 54 may contain microwave lenses and other devices for beam shaping. Multiple beams 26 may be generated by a given collection of radiating assemblies. These beams may be individually directed to different targets. The phasing of transmission is controlled by timing or reference signals from an external source so as to transmit a coherent composite microwave beam to microwave receiving units 20, 22 and 24 located on earth 14, or other locations in outer space.

Figure 3A:
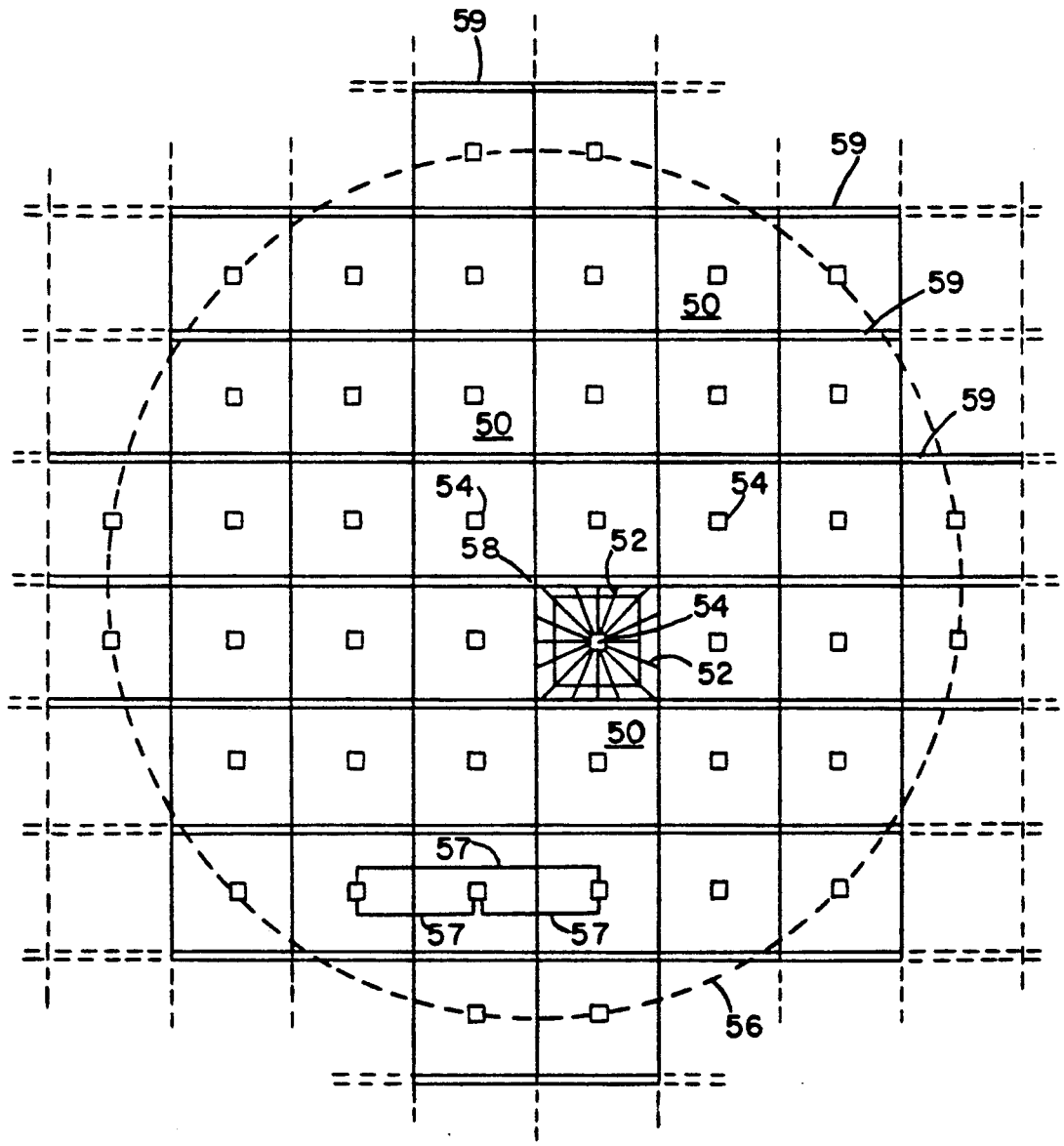
FIG. 3a is a schematic representation of the independent power collection and transmission plots which can be phased to form a lunar power station and to cooperatively beam power in a selected direction from the moon.
Figure 3B:
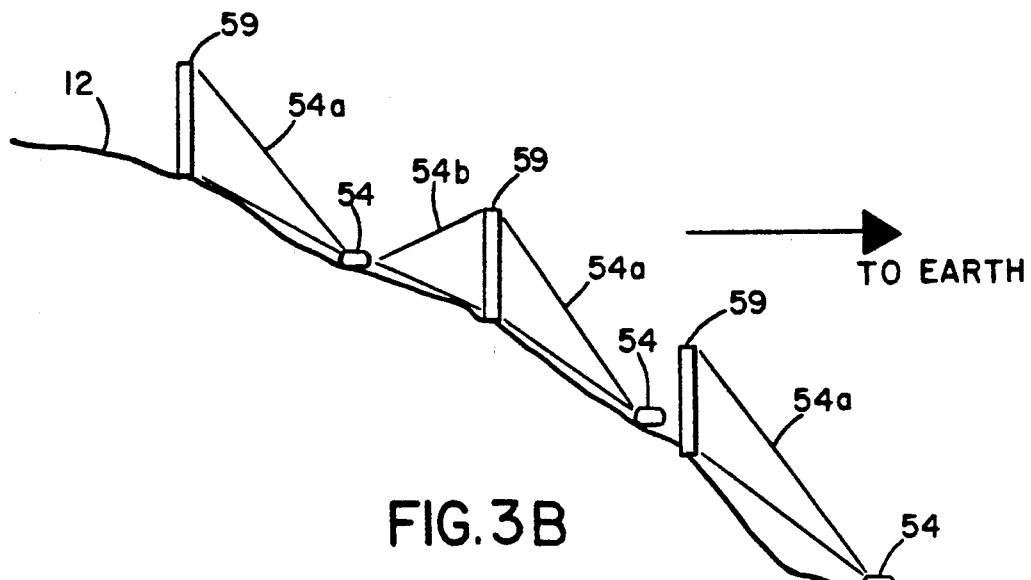
FIG. 3b is a side view of the arrangement of microwave reflectors with respect to central transmission device.

In the preferred embodiment, an array of microwave transmitters 54 is provided which does not view the earthward direction of the transmitted beam. Instead, the energy from each microwave transmitter 54 is directed in a beam or beams 54a approximately in the opposite direction to one of a plurality of large microwave reflector surfaces 59 as shown in FIG. 3b. Each plot of collector assemblies 50 has one or more associated microwave reflectors 59. Alternatively, the structures 59 may comprise microwave refractors and beams 54b may radiate through the refractors. Combinations of both techniques may be used.

Figure 3C:
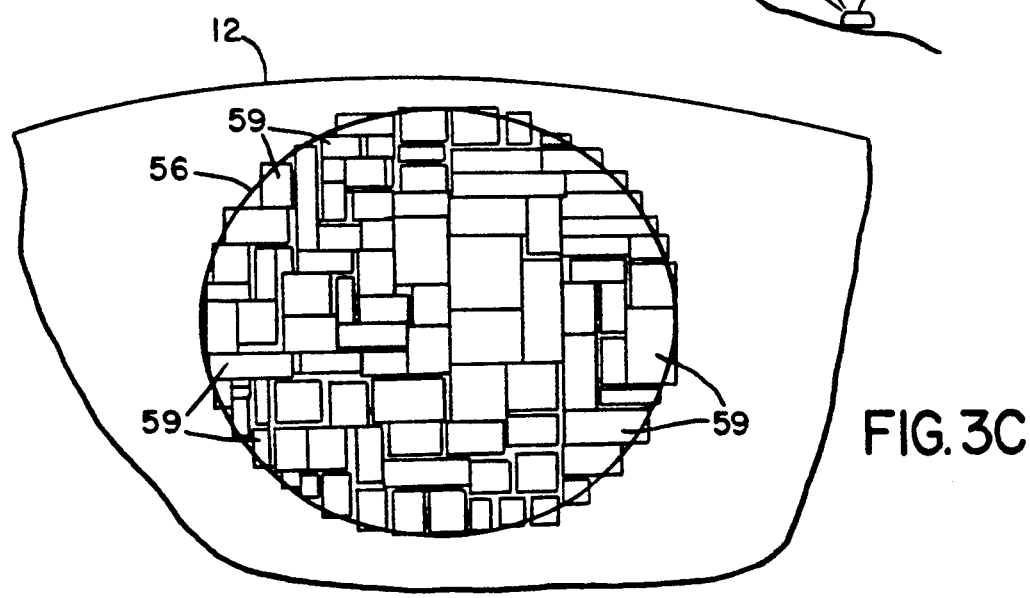
FIG. 3c is a front view as seen from earth of the arrangement of microwave reflectors about the lunar surface, illustrating the effective transmission aperture.

The reflector is a structure substantially transparent to incident solar radiation, but which reflects microwaves. This arrangement permits the microwave radiating aperture to be interleaved with the solar power collectors while minimizing the blockage of sunlight to the collectors. FIGS. 3b and 3c illustrate this arrangement in relation to the lunar surface. The microwave reflectors 59, when viewed from positions in the distance portions of the microwave beams will lie approximately within an area 56. The reflectors 59 will cover enough of the area 56 when viewed from positions in a transmitted beam to define a transmitting aperture for the microwave beam. In FIG. 3c, the reflectors are shown as touching or slightly overlapping so that they fill the area or aperture 56 nearly completely. However, this is an exaggerated case and the reflectors need not overlap or touch as shown in FIG. 3c, but in fact the the total reflector size may be much less than the total area of the aperture 56. The area 56 defined by microwave reflectors 59 has a generally circular shape as viewed in projection along beams 16 or 18. This projected or multiple surface of microwave reflectors 59 produces a tighter and smoother beam than is possible with isolated small microwave transmitters.

Thus, a microwave transmission system is provided which comprises a plurality or array of separate microwave transmitters or radiators, whose virtual images approach or overlap when viewed from the microwave beam so as to present an apparently substantially contiguous radiating aperture 56 which may be 100 km or more in diameter. The aperture is preferably between about 100,000 and one million times the wavelength of the transmitted radiation diameter. Such a system may be used in other, Earth-based applications as well as in the lunar power system described with suitable reduction in the size of the array.

The use of a greatly expanded total lunar projected aperture and the operation in the geometrical optics—Fresnel diffraction region permits use of a truly convergent power beam with substantially uniform power flux density across the wave front which may be modified to allow differential convergence in transverse axes to shape the beam cross-section to match that of a fixed Earth receiver area. As the lunar elevation changes, the convergence may be accomplished by deactivating some of the array elements or transmitters 54 to change the active aperture perimeter 56, by phase adjustment of radiating assemblies 54, or by a combination of both these methods.

The polarization of the transmitted beam or beams may be controlled by one of two methods:

1. The polarization of the prime transmitting or radiating structures may be rotated by rotating said structures or by adjusting the phase and amplitude of 2 independent orthogonal sources.

2. The polarization may be changed from linear to circular or vice versa by using 2 orthogonal parallel wire reflecting layers spaced by about 1/8th wave length and fed by linear or circular polarized prime radiating structures respectively.

The Earth receiving units must effectively receive and rectify the transmitted beam over the range of azimuth, elevation and polarization planes characteristic of the process. The first two factors depend on time of transmission while the latter is adjustable by methods just described.

Each microwave radiator or transmitting assembly 54 in the preferred embodiment comprises one or more individual transmitters and a microwave reflecting surface or wavefront management device for reflecting microwaves from the or each transmitter to a remote receiver unit. Alternatively, an array of separate microwave transmitters may be provided which themselves direct the beam in the direction of a remote receiver unit.

Figure 3D:
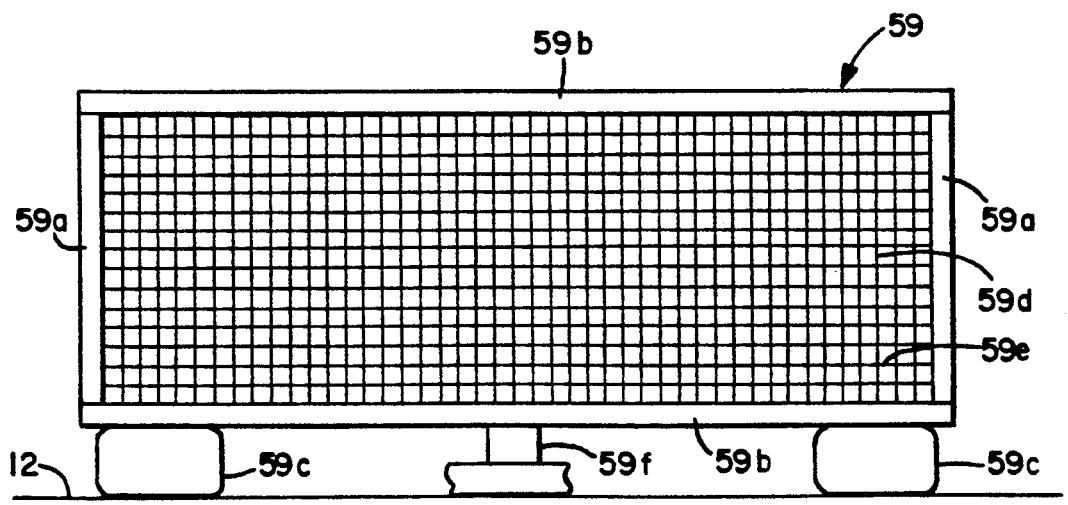

FIG. 3d shows an individual microwave reflector or wavefront management device 59. Its appearance generally resembles that of a billboard. This microwave reflector 59 is constructed with foamed glass uprights 59a and foamed glass horizontal members 59b. Uprights 59a are anchored to the moon by pilings 59c. Crossed threads 59d and 59e, formed of lunar glass or derived silicon, are extended taut across the frame so as to form a nearly flat or slightly curved surface. Threads 59d and 59e are coated with a thin film of electrical conducting metal, such as aluminum. This metal can be chemically refined from anorthositic lunar materials. The spacings between threads 59d and 59e must be significantly smaller than the wavelength of the photons used in the transmission system. The open space mesh reflectors will transmit at least 80 to 90 percent of the incident sunlight but reflect radiation of wavelength exceeding the average wire spacings by a factor of 5 or more.

It is possible to introduce more flexibility into power beaming by eliminating the fixed supports 59c and by mounting the microwave reflector 59 on support 59f. Support 59f is designed so as to rotate the reflectors 59 in azimuth and altitude. By phase controlling each of the individual microwave transmitters 54, a wide range of beam transmission directions can be produced through the use of support 59f. The surface of the microwave reflector may be curved to aid in forming a beam.

The wavefront management devices 59 need not be reflectors as shown but may be of many different varieties. They may be lenses through which the microwave beam passes modified by controlled refraction. The wavefront management devices may be composed wholly or in part of active or passive phase delay elements. Hybrid systems with reflectors, lenses and active and passive multiple units may be used.

The wavefront management devices 59 may combine in their functions that of the transmitter 54. Devices such as microstrip phased array transmitters can be made as large area devices which essentially fill the transmission aperture.

The wavefront management devices 59 in FIG. 3c need not be placed in regular order but can be distributed pseudo-randomly so as to minimize power transmission in side lobes near the central beam direction. In addition, pseudo-random placements can permit transmitters which are less area-filling for given side lobes amplitude levels of the power beam.

The separate plots 50 of solar power collectors supplying power to the array of transmitters may be repeated over large areas of the lunar surface. They may be located across from each other on the lunar limbs or on the far side of the moon. They may be contiguous for the most part. In the preferred embodiment each plot is associated with a substantially central transmitting assembly 54, but the transmitters may be positioned remote from the solar collector plots.

The radiating or transmitting assemblies 50 inside a given circle or radiating aperture, such as area 56 can be brought into phase so that the individual transmitters can act as a phased array which can generate one or more beams of power directed to one or more stations on Earth or to redirectors or reflectors in orbit about moon or Earth. Either signals from the earth or preprogrammed commands produced by phasing systems in space or on the moon can be used to define which ones of the plots 50 will perform as a coordinated array or aperture for a given time. Individual elements can be switched in and out during the operation of the array to change the shape or direction of the composite beam, for example, the center 58 of the transmitting array can be moved during transmission to change the path of the center of a given beam. The beam can be made convergent for a given target in the Earth-moon system because the effective aperture of the array is governed by the radius of the area 56 and can therefore be much larger than the aperture of the individual microwave transmitters 54. The individual plots 50 do not have to be contiguous. However, as reflectors 59 fill up the projected area of the beam, then more photon energy is placed in the beam.

Each power station may include more than one transmitting array or aperture 56. Different arrays can overlap so that the median of two areas 56 can contain plots 50 which may be side-by-side but are sending to different targets. The individual plots 50 do not have to be of the same size or the same power output. In addition, these plots 50 can be upgraded or repaired individually without having to shut down the entire system.

The array boundary 56 projected along the beam direction does not have to be circular, as in FIG. 3c, but can assume other shapes which are optimal for beam formation and focusing. More than one physically distinct array 56 can transmit to a target. The shapes of the individual plots 50 do not have to be square and the units do not have to be in contact. As an illustration of this concept, it is conceivable that an entire hemisphere of the moon could be used to produce a single beam if the individual units were present over a significant fraction of the lunar surface. The reflective surfaces or wavefront management devices 59 near the center of the lunar disk, as seen from earth, would be horizontal or almost horizontal to the local lunar surface. Transmitters 54 could be suspended above the reflectors 59 in towers.

The general physical orientation of transmitters and reflectors or wavefront management devices is somewhat dependent on their location on the moon and the direction of beaming from the moon. Horizontally oriented reflectors could be partially or fully covered by lunar soil to provide protection against temperature change, radiation and other disturbances. Temperature changes that occur on the lunar surface can induce physical dimensional changes and potential physical damage. Reflectors arranged generally parallel to and close to lunar slopes could also be partially or completely covered with lunar soil.

By operating with an at least partially convergent beam profile in the near field wave region, commonly described as the "Geometric optics—Fresnel diffraction" region, it is possible to control the cross-sectional area, shape and direction of the convergent microwave beam by altering the aperture perimeter by suitable switching of individual transmitters 54, by adjusting the phases of transmission of the various transmitters, or by a combination of both of these methods. Thus, it is possible to ensure that the transmitted beam will fall on a fixed area of the Earth, or other remote receiver structure, in spite of the rotation of the Earth as viewed from the moon and orbiting of the moon relative to the Earth as long as the receiver site is on the moonward side of the Earth and not too close to the Earth's limb as seen from the moon.

As in standard phased array radar techniques, each element or radiator in the microwave array emits a quasi-spherical wave and the plurality of superimposed microwaves will combine constructively or destructively according to the phase differences. By suitable control of the signal phase the single composite microwave beam can be steered. Suitable phase shifters are used to shift the relative phases of the beam, and these may be microprocessor controlled.

The arrangement of two lunar power stations on the east and west limbs of the moon, as seen from the Earth, is used because of the fact that a given lunar station has useful illumination only when the sun's elevation is above some limiting lower value and hence less than 50% of the month or the year and similarly an Earth station could receive the transmitted power only when the lunar elevation exceeds some minimal value. So that continuous power can be delivered to a given Earth station, it thus becomes necessary to provide efficient, economical power storage or to add other operating elements to the system to extend operating time.

The cost of energy storage is composed of power dependent and energy dependent terms. Providing storage for the 15 days or more that a lunar base is in shadow or low elevation sunlight would be generally uneconomical. However, by using two lunar bases located close to the east and west equatorial limbs of the moon but displaced toward the sub-earth point sufficiently that lunar libration will not lower Earth's elevation angle below a minimum value needed to present needed aperture projected areas, the lunar bases could sequentially and cooperatively furnish power to one or more Earth receiving sites whenever the sites had sufficient lunar elevations, except for a short period near new moon. When both bases would be in shadow, the power interruption period would be total for about $1\frac{1}{2}$ Earth days and the period of combined reduced and zero power would last up to about 3 days.

Provision may be made for energy storage at a single lunar power station for up to 3 Earth days' output or at both lunar stations for up to $1\frac{1}{2}$ Earth days' output. This could provide for essentially continuous power beaming to a succession of Earth points following the Earth's rotation, except during lunar eclipse.

Energy may be stored either as thermal energy mechanical energy (e.g. kinetic energy of a flywheel or other structure), electrochemical energy (e.g. storage batteries, fuel cells), or gravitational potential energy, or electromagnetic energy (capacitors/inductors).

A possible gravitational potential energy storage method on the moon which would be equivalent to earth-based pumped hydrostorage methods would use lunar solids such as soil or rock. Two possible storage systems comprise mechanically transporting a mass of lunar soil from a lower to a high elevation during periods of solar illumination and recovering the energy by returning the mass to the lower elevation at night or low power periods. The transport mechanism may comprise a conveyor or pulley system, or a catapult method.

The period of zero or reduced power can also be lowered by siting the centers of solar power collecting plots 50 farther toward the lunar limbs than the centers of beam transmitting arrays at the expenses of increased lengths of power transmission lines (For every 370 km of combined displacement, the reduced power period is shortened by 24 hour). If the power conversion sites extend partially past the visible limb, it is possible to eliminate the periods of zero or reduced power.

Using either or both of the preceding methods to assure continuous lunar generation capability reduces the maximum duration of energy storage needed for a given Earth station to a fraction of a synodic day (24.84 hr) during which the lunar elevation is below a minimum useful value. For an equatorial Earth base, the storage duration may range from about 13 to 16 hours depending on cut-off angle, while for an Earth station at 45 degrees latitude, the average storage duration will be about 16.7 hr with an extreme value of about 19.3 hrs. Any conventional form of energy storage may be used. Alternatively, pumped hydrostorage, compressed air storage, or a combination of both, may be used. In one example, compressed air may be forced into a sealed reservoir which lifts the water to the surface. During energy recovery, the compressed air filled reservoir is expanded through a turbine to atmospheric pressure. The water is then allowed to flow to the lower reservoir through water turbines.

In addition to or instead of energy storage on Earth, orbital beam reflectors may be used to extend Earth base operation.

Some preferred forms of solar power collector and converter structures constructed in plots 50 to provide microwave power to the transmitter arrays will now be described. However, it will be understood that microwave power may be provided from other sources in alternative embodiments.

Collected solar power may be converted to microwaves either indirectly, by conversion of solar power to electricity and then from electricity into microwaves, or by conversion of thermal energy into electrical energy, or directly by conversion of sunlight into microwave photons for example by photoklystron devices.

FIG. 5 shows a first embodiment of an individual solar power collector and converter structure on the moon 12. Specifically, this is a ridge-form of solar converter which can be formed on the moon 12 and used to receive solar radiant power from the sun. While this is the preferred embodiment of the conversion unit to be constructed on the moon, it should be noted that this is only one of a variety of possible devices for the conversion of sunlight to electricity or directly to microwaves (e.g. a photoklystron) which can be constructed on the moon primarily from lunar materials. A unique feature of the ridge-form of solar collector and converter structure 28 is that it uses the geometry of exposure to sunlight to even out the electric power production in the lunar day.

As can be seen in FIG. 5, the lunar soil 30 is seived, smoothed, and formed into mounds 32. A series of mounds 32 are aligned in the general north-south direction to cover the desired solar collecting area. These mounds 32 are nominally separated in the east-west direction by a distance sufficient to prevent excessive shadowing of each ridge by the next ridges in the lunar morning or evening.

Figure 9:
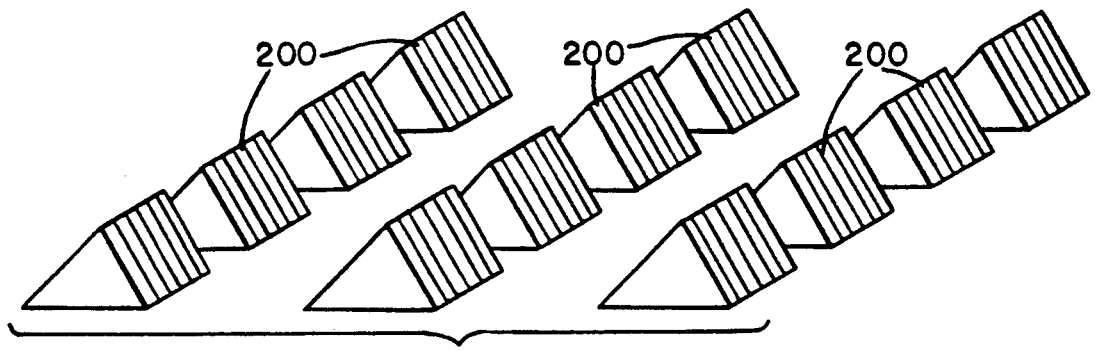
FIG. 9 is a perspective view illustrating an alternative embodiment of the ridge form of solar collectors and converters, in which a plurality of spaced and offset rows of ridge-form solar collectors are provided.

The mounds or ridges need not be continuous but may comprise spaced rows of short ridges as shown in FIG. 9. A thin layer 34 of native glass is applied to the ridge to bind together the sloping soil 32 as a cohesive layer. A thin layer 36 of iron or other electrically conductive, non-reactive (chemically) layer is vapor-deposited over the glass layer 34. The iron layer 36 serves as the mechanical substrate and electrical pickup for a thin-film solid state photoconversion layer 38. Photoconversion layer 38 is made of silicon. Other materials can also be utilized including those which could be imported from the Earth, (e.g. titanium, germanium, lower oxides of titanium, cadmium sulfide, lower sulfides of copper, selenides or tellurides of zinc, cadmium or copper, gallium arsenide, gallium phosphide, indium arsenide, manganese, iron, chromium, nickel or cobalt). A thin gridwork of iron 40 is vapor-deposited on top of the photoconversion layer 38 so as to complete the electrical circuit. A thin layer 39 of glass may be placed on top of photoconversion layer 38 so as to protect against solar wind, hydrogen atoms, and other forms of contamination. Electrical pickups are attached to the iron surfaces beneath the surface of the lunar soil 30 by leads 42 and 44. Leads 42 and 44, in turn, connect into the local power grid, as can be seen in FIG. 3, for connection to associated microwave transmitting assembly 54, which may comprise one or more microwave generators and antennas. The lunar iron in this solar converter structure 28 is acquired by beneficiating it in the form of micron-sized iron grains from the local soil, thermally separating it from adhering glass or minerals, and optionally electrorefining it on the moon. Silicon for use in the solar arrays can be obtained from the local lunar soil following the necessary chemical processing by means of machines brought from earth.

The ridges preferably take approximately the cross-sectional profile of an equilateral triangle. The spacing between the ridges is not critical. Such structures will effectively average the useful illumination and power collection over the period of lunar daylight.

The lunar environment is particularly suitable for the development of solar collectors and converters of this design. The lunar soils 30 are extremely good electrical and thermal insulators. There is no free oxygen or water in the lunar environment to damage, disturb, or interfere with the development and utilization of the solar converters. Finally, since the moon is seismically stable, the arrangement of ridges should remain free of significant geological disturbance.

The electrical output of a given inclined collector system can be augmented by diffusely reflected light. The contribution of diffusely reflected light will be greatest at local noon when the ground surface is at its brightest. The combined direct and diffuse illumination can be partially compensated by increasing the base angle of the ridge to greater than 60 degrees. The adjacent lunar soil surface reflectivity may also be increased by spreading a thin layer of white powder or glass material onto the surface, which can increase diffuse reflectivity to 90%. If this is applied for a distance of 3 face lengths in front of each ridge face and the base angle is also increased to 66 degrees, the noon illumination can be raised by about 24% and the average illumination may be raised by about 19% over solar elevations above 6 degrees.

FIG. 2 illustrates schematically an example of the construction of a lunar power station of the type shown in FIG. 3 made up of a series of areas or plots 50 of ridges as shown in FIG. 5 each associated with a microwave transmitter assembly and a reflector 59 of the billboard type. An automatic tractor 230 may be used to plow the lunar soil into a series of ridges. Power is brought by a grid of underground electrical wires from each ridge in a plot 50 to a collection of many solid state microwave transmission elements 54 at the center of each plot. The transmission elements 240 in a given plot illuminate the associated reflector 59 which is situated at the edge 232 of the plot or area remote from the Earth. The transmission elements in each plot are phased by local absolute clocks or a fiber optics network laid underground between the various transmitter sites in the array. FIG. 5 shows a ridge-form of solar collector and converter suitable for a lunar environment. However, there are other types of solar converters which would be suitable for the lunar environment. These types of solar converters could also make use of available lunar materials. As examples, alternative forms of solar collectors and converters are shown in FIGS. 6 and 7.

Figure 6:
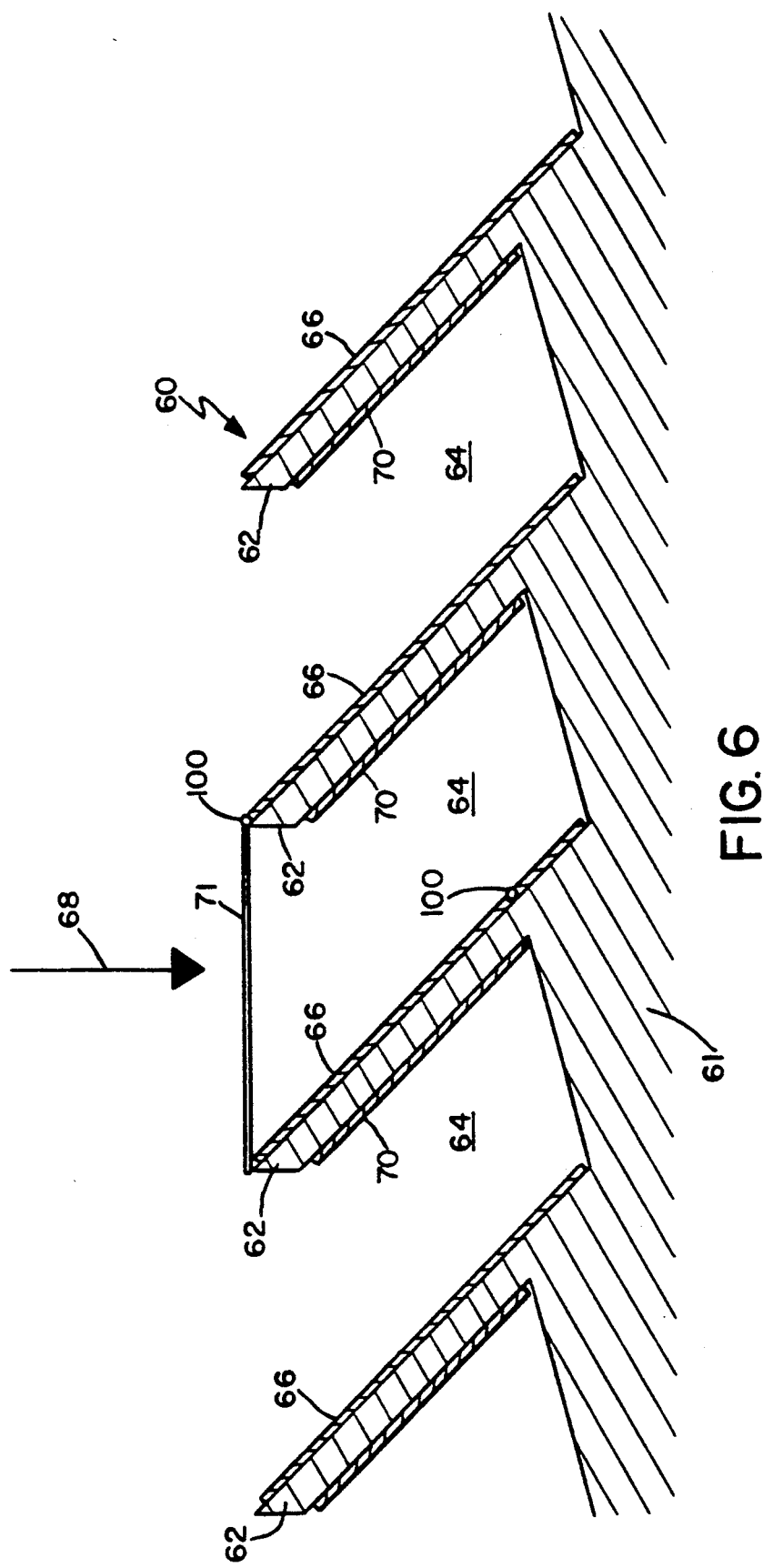
FIG. 6 is a cross-sectional view of an alternative embodiment of the solar converter of the present invention. Specifically.
Figure 7:
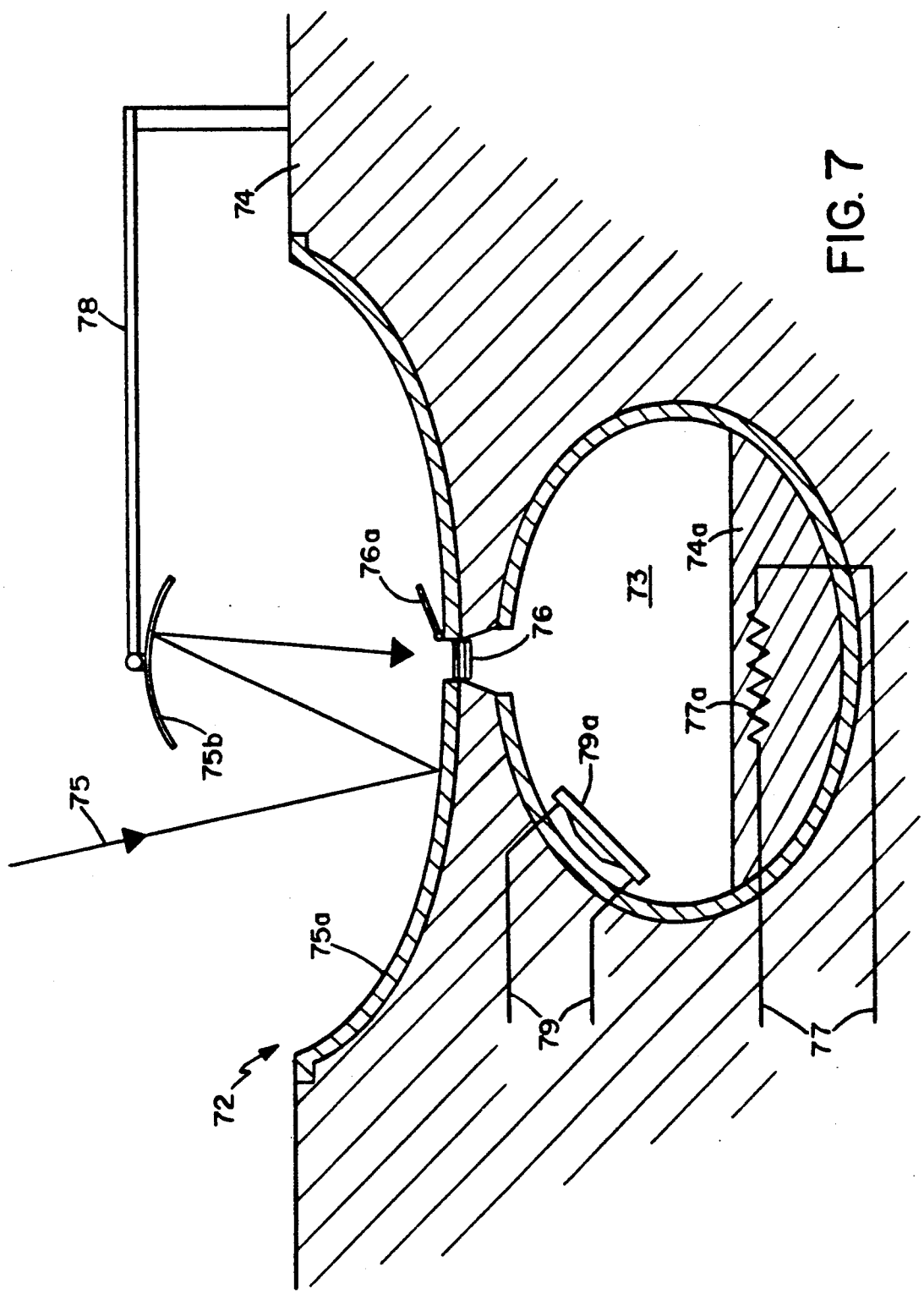
FIG. 7 is a cross-sectional view of an alternative embodiment of the solar converter of the present invention, which is a high temperature cavity form of photoconverter.

FIG. 6 shows a chevron-like form 60 of solar collector and converter. Specifically, FIG. 6 shows a cross-sectional view of trenches created in the lunar soil by melting a small skin of lunar soil to form mechanically stable chevrons. The lunar soil 61 and the fused soil 62 form the body of this form of solar converter. The compacted lunar soil may have been stripped of various minerals and elemental components. The trenches 64 are of indeterminate length and can be adjusted to the most appropriate angle, size and length for the desired solar converter. A thin film of aluminum 66, refined from lunar materials, is deposited on the spaceward facing surface so as to reflect direct sunlight 68 toward the back of the facing 70. The back of facing 70 contains a photoconverter. Electrical attachments from the associated microwave transmitter to the photoconverter on facing 70 can be made through the soil 61 and the fused wall 62 by wires placed in the trench wall prior to the fusing of the soil. Connections between cells can be made by wires placed in the soil 61 under the converters and mirrors, thereby avoiding any contact with the plasma environment just above the lunar surface. Thin transparent cover sheets 71 can be placed over trenches 64 to provide additional isolation against contamination, solar wind, and cosmic rays. These transparent coversheets 71 are of the type which are less transparent in the infrared spectrum. These sheets 71 can also be used to smooth thermal changes at sunset.

In an alternative arrangement (not shown) the solar collectors and converters may be in the form of a series of V-shaped ridges and trenches. To produce power levelling in this type of structure, one side facing of each trench need not be flat but may be in the form of a series of short triangular ridges when viewed from above, similar to those shown in FIGS. 5 and 9 but rotated by nearly 90 degrees. The opposite side facing is a reflective surface forming a virtual image of the sun nearly in the horizontal plane, so triangular ridges with nearly vertical apex edges will experience nearly the same illumination sequence as the ridges of FIGS. 5 and 9.

The trenches for the solar converters and mirror surfaces do not have to be open structures. An elaboration of the design is to make deep narrow cavities in which multiple light reflections are used to direct the solar energy to completely enclosed photoconverters. In this manner, a microenvironment can be created deeper in the lunar regolith to protect photoconverters from damaging photo and particle radiation, debris, sudden major temperature changes, etc. This shelter could be made predominantly from lunar material with simple thermal processing. The mirror surfaces do not have to be planar, but can be complicated shapes and even be optical gratings so that spectral splitting can be accomplished.

Mirrors 66 and optical cover 71 may be movable by means of thermally active hinges 100 or other solar tracking devices to allow one axis tracking of solar reflectors in orbit about the moon. They are preferably arranged to move so as to orient the surfaces as closely as possible to positions perpendicular to the incident solar rays throughout the lunar day.

Another form of the solar power collector and photoconverter structure is illustrated in cross-section at 72 in FIG. 7. This structure 72 comprises a groove of any chosen length in the lunar surface connected to a high-temperature cavity 73 made of beneficiated native materials, such as anorthite or refined compounds or elements (e.g., $Al_2O_3$ or Si). Cavities 73 can be buried under thermally insulating bulk or beneficiated lunar soils 74. These cavities 73 can be partially filled with basaltic-like native or derived materials 74a. Materials 74a are of the type which melt at a significantly lower temperature than the materials forming cavities 73. Solar energy 75 can be directed into these cavities 73 via simple reflectors 75a and 75b, either as concentrated sunlight (through windows 76 or other openings) or by electrical current through lines 77 and resistive heating element 77a during the times that regions 16 or 18 are illuminated. Since the axis of the moon is almost perpendicular to the ecliptic, relatively simple two-dimensional concentrators 75a and 75b with limited focus control 78 can achieve high concentration levels.

Power can be extracted from cavity 73 during the day and night by many means. Thermal energy could be extracted to provide process heat or drive turbines. High conversion efficiency output can be obtained by placing thermophotovoltaic solid state converters 79a in the cavity 73. These thermophotovoltaics 79a are manufactured to convert photons, just off the peak energy density of the radiation in the cavity, into electricity. Non-converted photons are recycled and reequilibrated in cavity 73 for possible later conversion to electricity. Power is extracted through leads 79. Cavity 73 can be thermally isolated at night by a cover sheet 76a. This cover sheet may be repositioned either automatically or mechanically by bimetallic devices over the entrance aperture. The cavity 73 may be permanently sealed by a glass lens or plate 76.

This approach is practical on the moon because the lunar soil is an extremely good thermal insulator. Additionally, the lunar soil can be a source of supply for the components of the chamber and the molten material used for energy storage. Operating problems are reduced by the moisture and oxygen-free environment.

A similar approach may be used for thermal stage of power in systems of the type shown in FIGS. 5 and 6. A large underground cavity of the type shown in FIG. 7 may be connected to the electrical grid of wires associated with one or more of the collector/converter arrays, and have a suitable heater for heating molten material in the cavity.

Figure 8:
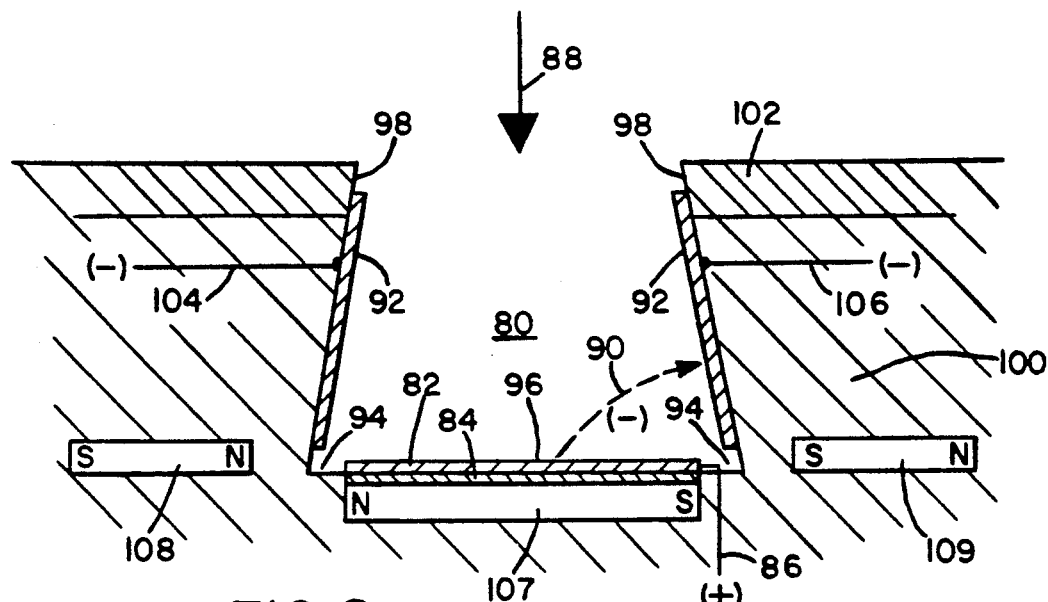
FIG. 8 is a cross-sectional view of an alternative embodiment of the solar converter according to the present invention. Specifically.

Another form of solar power collector and converter structure is illustrated in FIG. 8. FIG. 8 shows in cross-section a structure which is suited for construction on the lunar surface from primarily native materials. A series of small, spaced trenches 80 are made in the lunar surface and a thin layer of photoemissive material 82 is vapor deposited over a thin film of aluminum 84 in the base of each trench. A thin film of aluminum 84 is connected by an electrical lead 86 to a larger grid of photoconverters. Sunlight 88 ejects photoelectrons 90 from the material. A small fraction of the photoelectrons 90 impact on either one of two anodes 92. Anodes 92 are electrically separated by area 94 from the cathode 96. Anodes 92 are made by vapor depositing a thin film of aluminum or other electrically conductive material on the slightly inward vertical walls 98 of trench 80. The inward slope prevents direct illumination of the anodes 92 which suppresses back currents. The vertical walls are mechanically stabilized by fusing the soil 100 in a thin skin 102 after forming of the trench 80 in the soil 100. The electron current flow is extracted by means of leads from the cathode 96 and the two anodes 92. The leads 104 and 106 each introduce the power from this photoconverter section into the larger grid containing the array of microwave transmitters as in FIG. 3.

In an alternative version of the photoconverter of FIG. 8, the photoemissive layer 82 is vapor deposited on electrically separated small patches of electrical conductors in the bottom of the trench 80. These conductors could be formed as small patches with smaller separating regions of non-photoemissive surfaces. The patches extend across the width of the trench. The width of each conductive line is approximately equal to the gyroradius of the photoelectrons (now perpendicular to path 90) in the magnetic field of strip 107 which have energies of approximately 0.1 of the energy of the most populous of the differential photoelectron population of the emitted electrons. The electrons are made to have a gyroradius by layering native lunar irons in thin strips 107 under the patches or between the trenches 108 and 109 and magnetizing the iron layers so that a small magnetic field is impressed across the trenches parallel to the long axis of the photoconductive layers. Thus, most of the photoelectrons are made to step from one electrically conductive island to the next in the same direction down the long axis of the trench.

The cathode of the trench is the trench-end which the photoelectrons are moving away from, and will be the electrically positive lead end. The anode is at the other end of the trench. The device becomes more efficient as the separation distances between the edges of the islands decrease so that fewer electrons are impacted on non-conductive (electrically) soil. The efficacy of this approach is demonstrated by the fact that the magnetic fields on the lunar surface produce large potential differences by focusing the flow of solar wind electrons to the lunar surface and influencing the exact path of photoelectron return currents.

In another modification of the embodiment shown in FIG. 8, multiple grids may be placed above the photoemissive layer 96 and biased electrically so as to force the photoelectrons to oscillate between the grids. This device is a so called photoklystron which permits the direct conversion of sunlight into microwave energy.

Figure 10:
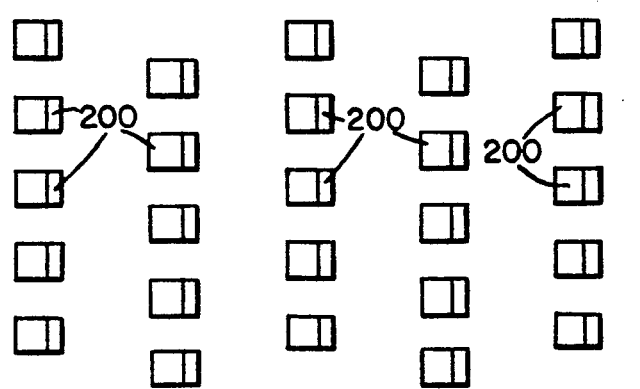
FIG. 10 is a top plan view illustrating the staggered arrangement of the ridges in FIG. 9.

FIGS. 9 and 10 illustrate another alternative embodiment of the solar collector and converter structure. In this example, instead of spaced single continuous ridges, a series of rows of mounds or ridges 200 of the general type shown in FIG. 5 are provided. Each row is aligned in a generally north-south direction and separated from the next row in the east-west direction. As shown in FIG. 10, the rows are staggered so that each mound in one row is aligned with the gaps between the mounds in the next adjacent row or rows. This can result in an equal or higher average illumination area for a given ground area.

Figure 11:
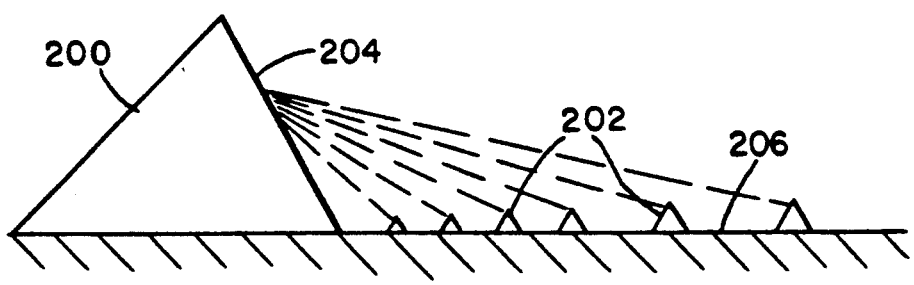
FIG. 11 is a side view of an alternative embodiment in which a series of smaller ridges of gradually increasing size or spacing are located on one or both sides of each converter mound or ridge.
Figure 12:
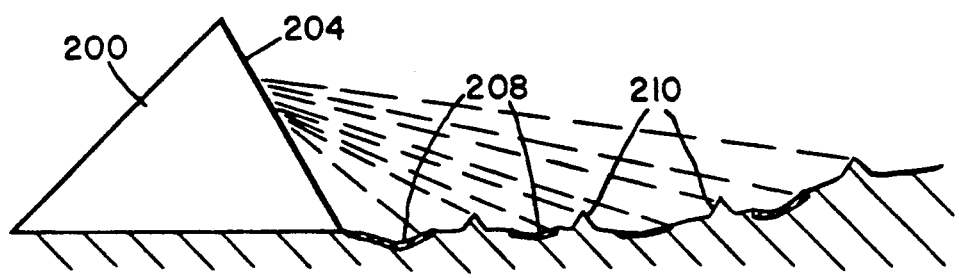
FIG. 12 shows another modification in which reflecting structures are provided in grooves on one or both sides of each ridge.

The ground adjacent to ridges of the type shown in FIG. 5 or FIG. 9 may be provided with diffuse or specular reflection structures to increase average power collection and conversion. This is illustrated in FIGS. 11 and 12. In FIG. 11 areas to the east and west of each mound of ridge 200 are provided with small ridges 202 of gradually increasing size. The ridges may be spaced so that a mid-point on the collector face 204 would see approximately equal fraction of the horizontal and inclined surfaces defined by the ridges 202. White powder or glass material is applied over the surface of the ridge area 206 so as to perform as an artificial "snow bank" or white sand surface. This raises the ground brightness and allows sunlight to be reflected from the ground area 206 onto the adjacent ridge or ridges. This arrangement may be arranged to produce an average ground brightness nearly independent of solar elevation.

Alternatively, as illustrated in FIG. 12, areas immediately east and west of the ridge faces 204 may comprise alternating specular and diffuse reflectors 208, 210. Specular reflectors 208 may comprise thin glass sheets or flakes with evaporated films of iron, nickel, aluminum, or other metals.

Alternate methods include many parallel layers of clear glass or molded prismatic glass sheets with V-shaped parallel grooves on the back side whose faces are inclined approximately + or −45 degrees to the planar front face. Horizontal specular reflectors can be conveniently prepared in-situ by applying radiant or other heat sources to smoothed lunar soil until it melts. Most lunar soils produce low viscosity glasses which level easily while the excellent thermal insulation qualities of the soil limit the depth of melt and serve as a container for the soil. After heat removal and solidification of the glassy melt, the surface may be metallized by vacuum evaporation of iron, aluminum, or other metal. The diffuse reflectors comprise layers of white powder to produce a snow bank effect.

Figure 13:
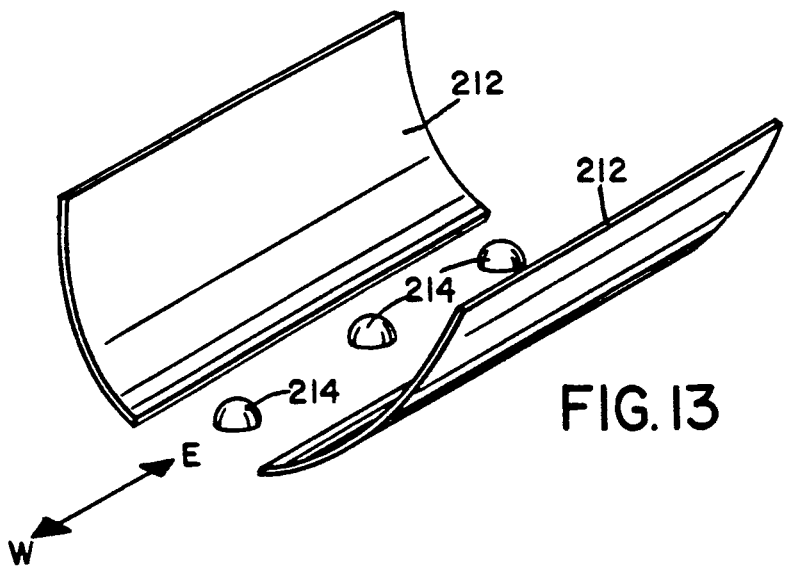
FIG. 13 is a perspective view of another alternative embodiment of the solar converter of the present invention, in which the reflector is in the form of a parabolic trough with a series of convertor structures spaced along the base of the trough.
Figure 14:
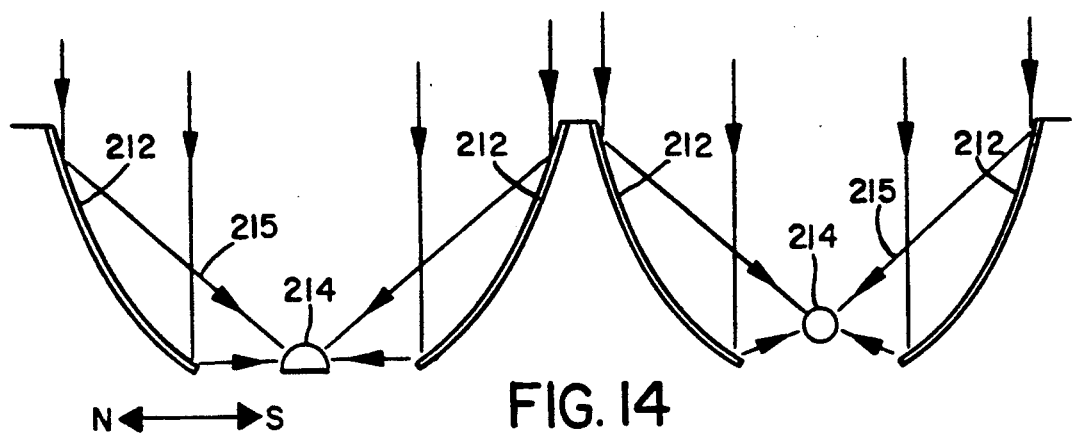
FIG. 14 illustrates the projection of incident and reflected solar rays on the converter of FIG. 11.

Another example of suitable solar power collector and converter structure is shown in FIGS. 13 and 14. In this example spaced split parabolic troughs 212 of specular reflectors lying along an east-west axis are prepared. The elevation of the bottom of the trough is conveniently set between about 30 degrees and 45 degrees while the elevation of the upper edge depends on the concentration ratio desired.

The projection of incident and reflected rays 215 on a north-south plane is independent of solar elevation and is shown in FIG. 14. To achieve nearly uniform output power, solar converter structures such as photoconverters 214 comprising domed partial spherical structures or nearly equivalent polygonal solids are spaced along the base of each trough. The projected areas of the converters are nearly independent of direction. The east-west spacing of converter domes is established by minimum solar elevations for which no ray interferences is encountered, perhaps typical values of 3 to 10 converter diameters may be used.

Only a small fraction of the rays 215 striking the troughs reach the target converters at any one time. If power leveling is not needed or desired, one may use target converters of full length strips, cylindric or prismatic segments so that all rays which strike the trough will intercept the converters.

Solar radiation incident on the trough surfaces and reflected onto the converter surfaces will be suitably converted into electrical power for connection to microwave transmitters in the transmit array, as described above in connection with FIG. 3.

FIG. 15 illustrates an alternative system for transmitting microwaves from the moon to Earth. In this system, a microwave reflector or beam redirection device is provided in orbit about the Earth to direct microwave beams from the moon to receiving stations at high altitudes or angularly distant on Earth from the sub-lunar point. As shown in FIG. 15, a power station 110 located on the earthward side the moon 12 beams a microwave (coherent photon) beam 112 toward the earth. The beam 12 is reflected onto a receiving station 114 on earth. At this receiving station 114, the power in the photon beam 112 is converted into electrical current. On the opposite limb of the moon, a lunar power station 116 beams microwaves 118 to a microwave reflector or redirector device 120 in orbit 122 about the earth 14. In this case the redirector device is a microwave reflector 120 which reflects beam 118, as beam 124, to a receiving station 126 on Earth. However, it may comprise any form of wavefront management device such as lenses, reflectors, active or passive phase delay devices, or reception and retransmission systems which re-transmit at the same or different frequencies to the input microwave beam. Device 120 may transmit more than one beam. It may transmit beams in directions corresponding to the angles implied by simple geometric reflection. It is important to note that as the number of receivers 126 and orbital microwave reflectors and re-directors 120 increase, more power can be transmitted to Earth.

The orbital device can be arranged to cooperate collectively with each other to direct power to all Earth stations at the level needed at a given time.

The rotation axis of the moon 12 is almost vertical to the ecliptic plane and makes an angle of approximately 1.5 degrees off the vertical. The rotation axis of the earth 14 is inclined approximately 23 degrees from the plane of the orbit of the earth about the sun. The direction of solar radiation is indicated by arrow 128 in FIG. 15. The orbit 122 of the reflective mirror or re-director device 120 is established so as to most advantageously direct the microwave beam to the receiving station 126, or to other users or devices in the vicinity of Earth. The orbit 122 is not necessarily a geosynchronous orbit or even in the plane or the equator of Earth. High inclination orbits can be established. The lunar power station 110 or 116 can supply power to the earth only when illuminated unless energy storage is provided. The earth is approximately fixed in the lunar sky of a given station. The lunar station is capable of directing the microwave beam to a given station on the earth as the station turns into view or directing the beam to reflectors in orbit about the earth 14. Use of re-direction devices such as reflectors potentially enhances the ability to direct the microwave beam, to enhance the power transmission, and to deliver a more even flow of power to all stations on Earth from a minimum set of stations on the moon. The orbiting redirection devices or reflectors can become basic elements of a planet-wide power distribution system in which the power needed only enters the biosphere once.

Multiple re-direction devices or reflectors may also be used in orbit about the Earth. Power can be reflected or re-directed two or more times to reach users on Earth or in space. The reflectors 120 may also be configured as retransmitters. They could operate by receiving power at one frequency, converting it to another frequency, and then retransmitting it.

Another embodiment of the present invention incorporates the use of orbiting sunlight reflectors about the surface of the moon 12. These orbiting reflectors can serve to increase the exposure of the lunar receiving units to sunlight and to increase the power transmission capabilities of the lunar power station. FIG. 16 is a view of the moon 12 from above the North Pole. The sunlight 130 is coming from the upper left and illuminating the moon hemisphere away from Earth. The dotted lines 132 and 134 define the extreme limits of the limb of the moon 12 as seen from the Earth. Lunar power station 136 is visible from the Earth at all times, whereas lunar power station 138 is invisible from the Earth at all times. The stations 136 and 138 are not necessarily on the equator of the moon and can be located nearer either pole than the equator and do not have to be distributed about the same latitudes. This figure reveals various ways that the power streams to the Earth can be smoothed in time.

The electrical energy at station 138, as high voltage AC or DC, can be transmitted to station 136 by means of high voltage transmission line 140. The power stream from the moon 12 to the Earth 14 will be smooth if two sets of these stations are located across the east and west limbs of the moon. At least one station of the four will always be illuminated and can send power to the corresponding earthward station for transmission.

The station 138 can direct a microwave beam to a microwave reflector mirror or other re-director device 144 in lunar orbit 146. Microwave reflector 144 can then reflect the beam 142 into an earthward direction as beam 148. Also, optically reflective mirror 150 in lunar orbit 146 (not necessarily the same orbit as for microwave mirror or re-director device 144) can reflect sunlight 152 to the lunar surface as beam 154. The sunlight is directed to the earth-side power station 156, but may alternatively be directed to stations such as 138. More than one mirror 150 can be used to illuminate a given lunar power station. From station 156 the microwave beam 158 is generated and directed toward Earth. Orbit 146 does not have to be circular or in the equatorial plane of the moon. Both types of redirector devices or mirrors 144 and 150 may be controlled by reaction engines, gravity gradients, tethers, moment of inertia changes or radiation pressure to point in the appropriate directions at the appropriate times to reflect beams. Device 144 and 150 could be the same type of re-director device, such as a mirror. Many mirrors and orbits can be used at the same time about the moon so as to minimize the need for multiple bases.

The variety or embodiments within the concepts as illustrated in FIG. 16 may be included to enhance the capabilities of this lunar power station in accordance with the present invention. The systems as shown in FIGS. 15 and 16 provide the capability to distribute power on a planet-wide scale so as to follow the diurnal patterns of power usage on Earth. Since the power only enters the biosphere once via the beams, the primary power production system can be minimized. As a result, this system provides for lowest costs and quickest completion. Intense power can be received almost anywhere on or above the earth via this system. It is not strongly dependent on local terrain, natural resources, or even the availability of land.

The use of a power station on the moon offers a number of advantages not found in prior actual or proposed extraterrestrial power systems. Of particular importance is the fact that the lunar power station could be constructed from materials found in abundance in the lunar soil. Even in the early stages of development, it would be possible to use substantial quantities of available lunar material for both the lunar power station and the production equipment used to build the station. One useful chemical element is iron, which can be separated by magnetic means from the bulk of the lunar soil with minimal complexity and minimal energy. This iron can be used for mechanical, electrical and magnetic functions. Other elements, such as the attached glass and assorted minerals may also be separated by several presently available techniques. The iron is present as tiny spheres and globes, many in the one to fifty micron diameter range, in both the soils of the lunar mare and highlands. Thermal heating can separate the iron from the glass using solar concentrators. It is advantageous in some applications to electrorefine the iron to remove minor amounts of nickel and cobalt. Because the lunar soil is pulverized, and due to the low lunar gravity, relatively little mechanical work is required to remove the iron metal from the local soil. The lunar soil and its derivatives may be used to provide structures, electrical and thermal insulations, transparent covers, and many other uses.

It should be noted that the various subsystems of a lunar power station as described above do not strongly interdigitate, as is the case with previously proposed satellite solar power stations (SPS). For example, SPS orbiting structures (microwave and/or optical collectors) must be optimized in mechanical properties to allow accurate pointing of portions toward earth targets and also to point another massive component toward the sun and, in addition, support interconnections between the power sources, the solar cells, and the mutually moving continuous antenna array. In the present invention, the solar conversion devices do not have to be optimized for minimal mass and maximum efficiency for use on the moon. In the present invention, these systems can be designed to be produced primarily out of the lunar feedstock with supplementation from minor-mass elements which may be needed from Earth. There is a minimal restriction to the use of solid state conversion devices for the lunar application. This lunar power station permits much more compact power receptors on earth than does the SPS system, may have improved reliability and is more immune than a satellite from meteoric of other space debris damage. It can also be readily modified and expanded with improving technology. Considerations of production and costs per watt become of direct relevance in the selection of the conversion device. Costs of transport from Earth and development of mass efficient devices (i.e. of low kg/kw) are of secondary concern since costs/lb are practically immaterial for mass sources already available at the point of use.

Advantages of solar based power stations as opposed to Earth based systems include reduced periods of low solar exposure during Earth winter. The synodic period for the moon is approximately 29.53 days. The lunar station is independent of cloudiness and is not exposed to such extreme weather conditions.

There are various other features of the lunar environment which are particularly conducive to the construction of lunar based solar power stations. These positive environmental factors include: (1) the very high vacuum and absence of disruptive chemical effects on thin-films; (2) the extremely stable mechanical environment of the lunar surface and its remoteness; (3) the complete dryness, high electrical resistivity and thermal insulating properties of the lunar soil which make it possible to build electronic components on and in the soil protect them from thermal changes, radiations, deliberate damage and plasmas; (4) vast areas are available for constructing large areas of converters and transmitters; (5) the moon is an exceptionally stable platform orbiting the Earth in a very regular and known manner; (6) chemically-free iron is available for the early stages of construction; (7) lunar derived materials can be used to support many phases of the space operations which support both construction of the lunar power system and other projects; and (8) simpler solar concentration systems due to the small lunar obliquity (1½ degrees). The Apollo, lunar science research, Skylab and shuttle programs have established the major portions of the research and development needs for the present invention. The tools necessary for high rates of production on the moon are within the state-of-the-art of present industrial capabilities.

Variations to this general approach are likely applicable to other natural objects in the solar system (e.g., Mercury, various asteroids, and the moons of Mars). Various non-microwave means of power transmissions are also clearly applicable (e.g., charged or neutral particle beams, lasers, etc.). On Earth, several different approaches to power reception are possible. These have been proposed for use in conjunction with the SPS. Such approaches to power reception could include heat engines driven by laser or particle beams. Photovoltaic arrays can be situated under the terrestrial rectenna elements of the microwave system.

For efficient power reception at the receiving units on Earth it is necessary that the amount of power reflected be minimized which requires that the gain and impedance of the receiving array antennas be properly matched to the input waves.

This can be done by individually rotating and aligning half wave or shorter dipole antennas of other directional antennas to proper directions to face the incoming power beams, but this is more costly than systems which use fixed structures.

For days in which the lunar maximum elevation is high and for non-equatorial Earth locations, it may be desirable and possible to collect power for lunar excursions of 120 degrees to as much as 180 degrees or more in celestial longitude (Right Ascension). Most fixed antenna systems cannot operate efficiently over a wide range of input angles. An exception exists for dipole or monopole antennas whose axes are perpendicular to the equatorial plane. These antennas have pattern symmetry about the polar axis but require input radiation polarized with electric vector parallel to the polar axis for maximum efficiency. This may be obtained by rotation of plane of transmission on the moon by $+/-22$ degrees to $+/-25$ degrees during a monthly cycle of operation. Actually the departure of a fixed direction of polarization (For example on the lunar or ecliptic pole) from ideal polarization is not serious and would result in a loss of about 7 to 9% of beam energy representing the orthogonal fraction.

A second alternative is to transmit a circular polarized wave which may be received using circular polarized omnidirectional antennas such as loop and monopole or slotted cylinder types with polar axes. For such systems, no adjustment of transmission polarization is required.

A further possible modification of receiver antenna systems is to use optical concentration by reflecting structures to raise the beam intensity and lower the actual active antenna aperture areas needed to process and rectify the power beam. While this would be a relatively simple matter for SPS Systems in which the beam direction does not change, it requires careful design for the lunar system with its variable beam direction. Most, if not all, high concentration ratio optical systems suffer severe spherical aberration errors if used over a large range of beam angles. One system previously described in the art which performs one axis concentration without measurable spherical or cylindrical aberrations is a circular cylinder with periodic reflector strips arranged along its inner surface. The angles between the strip change by only about one-fourth of the angular arc measured on the cylinder cross section. Input parallel rays are brought to a line focus on the projected extension of the cylinder, regardless of input direction. Use of such a concentrator requires either continual repositioning of the image receiver except when the moon is in the equatorial plane or else simultaneous rotation of the reflector strips. The reflector strips may be curved to correspond to surfaces on a torus to produce partial convergence and concentration along the other axis, but this will introduce some residual aberrations.

Beam concentration could result in radiation intensities which may be dangerous to bird and insect species in the receiver sites and require application of repellent techniques.

Beam reflector strips can be made of very low cost, open mesh reflectors.

The proposed lunar power system can use the moon, its environment, and its orientation in the earth-moon system as "gifts of nature", like coal or iron ore, to increase the net wealth of mankind with minimal destruction of natural resources.

The power transmitting system which permits transmission of power in a controllable microwave beam by means of an array of separate microwave transmitters is not limited in usefulness to a lunar environment but may also have applications to power transmission and receiving systems on Earth, in association with suitable power sources such as an assembly of solar power collectors.

A well defined microwave beam is possible because of the large transmitting aperture which may, for example, be synthesized from any appropriately positioned separate microwave transmitters, or combined transmitters and reflectors which completely or nearly completely fill the projected apparent aperture when viewed from a suitable receiver. Each reflector may serve as the reflection surface for hundreds, or even thousands, of individual microwave beams. When the segmented reflectors are used as part of a lunar power station, they are preferably arranged in an elliptical area near lunar limb so as to apparently overlap a filled, circular transmitting aperture 10 km to 100 km across when viewed from Earth.

To a first approximation, the segmented lunar antenna can be modeled as a set of spatially non-periodic radiators. The number (N) of radiators will be in the millions. The average intensity of stray power of a given beam will be 1/N of the intensity of the beam. It is conceivable that the stray microwave power of the LPS beaming 10,000 GWe could be less than a few billionths of a watt per square centimeter (few nanowatts/cm.$^{**}2$) at Earth. This is a power level 10 to 100 times less intense than the human body radiates as incoherent power in the microwave region. If such a low level of incoherent stray power can be attained, then there is no biological risk from exposure to microwave outside the main beams. It may be possible to provide economic power via the lunar power system at beam intensities so low that heating of animals is negligible. Power would be cheaper at higher beam intensities.

Although some preferred embodiments of the invention have been described above by way of example, it will be understood by those skilled in the field that modifications may be made to the disclosed embodiments which are within the scope of the invention as defined by the appended claims.

We claim:

1. A solar power collection and transmission system comprising:
    a plurality of solar power collecting assemblies for collecting solar radiation incident on said solar power collecting assemblies;
    means defining a microwave radiating aperture of predetermined area comprising an array of separate, spaced apart microwave sources for emitting a plurality of separate microwave beams, and structurally separate microwave redirector means for redirecting the emitted microwave beams in a predetermined beam direction and expanding the effective microwave emitting area to substantially fill the microwave radiating aperture;
    conversion means associated with each solar power collecting assembly for converting said collected solar power into a power form suitable for connection to said microwave sources;
    each solar power collecting assembly and associated conversion means being connected to at least a respective one of said sources;
    phase control means associated with said microwave sources for controlling the relative phase of microwave beams emitted from said sources to form a composite, shaped microwave beam directed from said microwave redirector means, the composite beam having separate radiating near field and far field regions; and
    at least one microwave receiver assembly positioned in the radiating near field region of said microwave beam.

2. The system of claim 1, further including:
    at least one receiver assembly remote from the radiating aperture and located in the near field of said composite beam;
    said phase means further comprising means for directing said composite beam at said receiver assembly.

3. The system of claim 1, wherein said microwave redirector means comprise a plurality of microwave reflectors separate from said microwave sources for reflecting said microwave beams from said sources into said beam direction.

4. The system of claim 3, wherein said microwave reflectors are positioned so as to lie substantially within and cover substantially the whole area of the radiating aperture when viewed from a position in the composite microwave beam.

5. The system of claim 1 wherein each microwave source comprises at least one microwave generator and at least one associated radiating antenna, and said microwave redirecting means comprises a plurality of microwave reflective surfaces which are substantially transparent to incident sunlight and are positioned to reflect microwave beams emitted from said antennas in a predetermined direction, said microwave reflective surfaces being positioned to lie within said radiating aperture and cover substantially the whole area of said aperture when viewed from a position in said composite, shaped microwave beam.

6. The system of claim 1, wherein said solar power collecting assemblies each comprise an area of solar collector structures having photoconversion surfaces arranged to permit exposure to incident sunlight over a wide range of angles of incident sunlight and electrical connector means are provided for connecting said photoconversion surfaces in each area to a respective one of said microwave sources.

7. The system of claim 6 wherein each microwave source is positioned in a respective one of said solar collector areas.

8. A method of transmitting a microwave beam to at least one receiver located in the radiating near field region of the microwave beam, comprising:
    collecting solar radiation incident on a plurality of solar power collecting assemblies;
    forming a microwave radiating aperture of predetermined area by arranging an array of separate, spaced apart microwave sources to form a series of separate microwave beams directed at a series of separate microwave reflectors for reflecting and redirecting the separate beams into a common beam direction and expanding the effective microwave emitting area to substantially fill the microwave radiating aperture, the microwave reflectors being positioned so as to apparently define a radiating aperture of said predetermined area when viewed from the common beam direction;

connecting the microwave sources to conversion means associated with the solar power collecting assemblies for converting the collected power into a power form suitable for connection to said microwave sources, each solar power collecting assembly and associated conversion means being connected to at least a respective one of said microwave sources;

controlling the phase of the microwave beams emitted from the microwave sources so as to combine the separate beams into at least one composite, shaped microwave beam directed from said microwave reflectors, the composite beam having a separate radiating near field and far field region; and receiving the microwave beam at at least one microwave receiver assembly located in the radiating near field region of the microwave beam.

9. The method of claim 8, further including the step of:

positioning a microwave receiver structure in the near field of the shaped microwave beam.

* * * * *